（12） United States Patent
Saitoh et al.

(10) Patent No.: US 11,480,716 B2
(45) Date of Patent: Oct. 25, 2022

(54) OPTICAL ELEMENT THAT FUNCTIONS AS A LIQUID CRYSTAL DIFFRACTION LATTICE

(71) Applicant: FUJIFILM Corporation, Tokyo (JP)

(72) Inventors: Yukito Saitoh, Kanagawa (JP); Hiroshi Sato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/950,541

(22) Filed: Nov. 17, 2020

(65) Prior Publication Data

US 2021/0088703 A1    Mar. 25, 2021

Related U.S. Application Data

(63) Continuation of application No. PCT/JP2019/019794, filed on May 17, 2019.

(30) Foreign Application Priority Data

May 18, 2018    (JP) .............................. JP2018-096569

(51) Int. Cl.
  *G02B 5/18*    (2006.01)
  *G02B 5/30*    (2006.01)
  *G02F 1/13363*    (2006.01)

(52) U.S. Cl.
  CPC ............. *G02B 5/18* (2013.01); *G02B 5/3016* (2013.01); *G02F 1/133636* (2013.01);
  (Continued)

(58) Field of Classification Search
  CPC .................................................. G02F 2413/06
  See application file for complete search history.

(56) References Cited

U.S. PATENT DOCUMENTS

2003/0137627 A1*    7/2003    Ito ..................... G02F 1/133636
                                                              349/117
2008/0278675 A1    11/2008    Escuti et al.
(Continued)

FOREIGN PATENT DOCUMENTS

JP    2008-532085 A    8/2008
JP    2010-525394 A    7/2010
(Continued)

OTHER PUBLICATIONS

Japanese Office Action for corresponding Japanese Application No. 2020-519956, dated Aug. 10, 2021, with English translation.
(Continued)

*Primary Examiner* — Lauren Nguyen
(74) *Attorney, Agent, or Firm* — Birch, Stewart, Kolasch & Birch, LLP

(57) ABSTRACT

The optical element is an optical element including a first optically anisotropic layer which is a cured layer of a liquid crystal composition containing a rod-like liquid crystal compound and a second optically anisotropic layer which is laminated on the first optically anisotropic layer and is a cured layer of a liquid crystal composition containing a disk-like liquid crystal compound, wherein each of the first optically anisotropic layer and the second optically anisotropic layer, has a liquid crystal alignment pattern in which an optical axis of the rod-like liquid crystal compound and an optical axis of the disk-like liquid crystal compound are respectively parallel to a surface of the optically anisotropic layer and oriented along at least one in-plane direction, orientation of the optical axis changes continuously and rotationally, and the orientation of the optical axis rotates by 180° with a period of 0.5 µm to 5 µm.

10 Claims, 13 Drawing Sheets

(52) U.S. Cl.
CPC ...... *G02F 2413/06* (2013.01); *G02F 2413/07* (2013.01); *G02F 2413/105* (2013.01)

(56) References Cited

U.S. PATENT DOCUMENTS

| | | |
|---|---|---|
| 2010/0225876 A1 | 9/2010 | Escuti et al. |
| 2013/0027656 A1 | 1/2013 | Escuti et al. |
| 2016/0011353 A1 | 1/2016 | Escuti et al. |
| 2016/0033698 A1 | 2/2016 | Escuti et al. |
| 2018/0164480 A1 | 6/2018 | Yoshida |

FOREIGN PATENT DOCUMENTS

| | | |
|---|---|---|
| JP | 2014-528597 A | 10/2014 |
| JP | 2016-519327 A | 6/2016 |
| JP | 2017-522601 A | 8/2017 |
| WO | WO 2016/194961 A1 | 12/2016 |

OTHER PUBLICATIONS

International Preliminary Report on Patentability, dated Dec. 3, 2020, and Written Opinion of the International Searching Authority, dated Aug. 13, 2019, for International Application No. PCT/JP2019/019794, with an English translation.
International Search Report for International Application No. PCT/JP2019/019794, dated Aug. 13, 2019, with an English translation.
Kobashi et al., "Planar optics with patterned chiral liquid crystals," Nature Photonics, Apr. 11, 2016, 5 pages total.

\* cited by examiner

OPTICAL ELEMENT THAT FUNCTIONS AS A LIQUID CRYSTAL DIFFRACTION LATTICE

CROSS-REFERENCE TO RELATED APPLICATIONS

This application is a continuation application of International Application No. PCT/JP2019/019794, filed May 17, 2019, the disclosure of which is incorporated herein by reference in its entirety. Further, this application claims priority from Japanese Patent Application No. 2018-096569, filed May 18, 2018, the disclosure of which is incorporated herein by reference in its entirety.

BACKGROUND OF THE INVENTION

1. Field of the Invention

The present disclosure relates to an optical element which can control a reflection direction of an incidence ray.

2. Description of the Related Art

Since polarized light has been used in various optical devices or systems, there is a demand for an optical element for controlling reflection, focusing, and divergence of polarized light.

JP2016-519327A discloses a polarization conversion system using a geometric phase difference hologram which comprises an anisotropic alignment pattern.

JP2017-522601A discloses a diffractive optical element in which a liquid crystal alignment pattern is changed in a plane of a thin film having optical anisotropy.

"Planar optics with patterned chiral liquid crystal" (Nature Photonics, Kobayashi et al., 2016. 66 (2016)) describes that the phase of light reflected by a cholesteric liquid crystal is changed by the phase of a helical structure, and the phase of the helical structure is spatially controlled, and thus the wave surface of the reflected light can be optionally designed.

SUMMARY OF THE INVENTION

An element (hereinafter, referred to as a liquid crystal diffraction lattice) that diffracts light by changing the liquid crystal alignment pattern in the plane as described in JP2017-522601A is expected to be applied as an optical member for beam steering which is carried out by bending beam light in an optional direction. However, in the method using a liquid crystal alignment pattern, there is a problem in that birefringence peculiar to the liquid crystal material occurs with respect to light having a wavelength other than that for diffracting beam light. More specifically, in a case where infrared light is sensed through a liquid crystal diffraction lattice 1 by providing a sensor 2 on a side of a visible light incident surface of the liquid crystal diffraction lattice 1 in the liquid crystal diffraction lattice 1 that performs beam steering on visible light Lv as illustrated in FIG. 20, infrared light $L_{Ir}$ obliquely passes through the liquid crystal diffraction lattice 1 to cause a retardation, and thus the polymerization direction of the infrared light before being incident on the liquid crystal diffraction lattice 1, for example, the state of linearly polarized light is changed to a different state of polarized light. Therefore, in a case where light to be sensed has a polarization component and the detection sensitivity of the sensor has polarization characteristics, there is a problem in that the intensity of the light to be sensed changes depending on the incidence angle of the light with respect to the liquid crystal diffraction lattice and this change results in occurrence of a sensing error.

An object of the present disclosure is to provide an optical element that can obtain diffracted light and simultaneously allow light having a wavelength different from the wavelength band of the diffracted light to be transmitted without influence of birefringence.

An optical element according to an aspect of the present disclosure comprising: a first optically anisotropic layer, which is a cured layer of a liquid crystal composition containing a rod-like liquid crystal compound; and a second optically anisotropic layer, which is laminated on the first optically anisotropic layer and is a cured layer of a liquid crystal composition containing a disk-like liquid crystal compound, in which the first optically anisotropic layer has a first liquid crystal alignment pattern in which an optical axis of the rod-like liquid crystal compound is parallel to a surface of the first optically anisotropic layer and is oriented along at least one in-plane direction of the first optically anisotropic layer, orientation of the optical axis of the rod-like liquid crystal compound changes continuously and rotationally, and the orientation of the optical axis of the rod-like liquid crystal compound rotates by 180° with a period of 0.5 µm to 5 µm, and the second optically anisotropic layer has a second liquid crystal alignment pattern in which an optical axis of the disk-like liquid crystal compound is parallel to a surface of the second optically anisotropic layer and is oriented along at least one in-plane direction of the second optically anisotropic layer, orientation of the optical axis of the disk-like liquid crystal compound changes continuously and rotationally, and the orientation of the optical axis of the disk-like liquid crystal compound rotates by 180° with a period of 0.5 µm to 5 µm.

The optical element according to the aspect of the present disclosure, in which an in-plane retardation of the first optically anisotropic layer with respect to light having a first wavelength $\lambda_1$ may be in a range of $0.36\lambda_1$ to $0.644\lambda_1$.

In the optical element according to the aspect of the present disclosure, an in-plane retardation of the second optically anisotropic layer with respect to light having a second wavelength $\lambda_2$ may be in a range of $0.36\lambda_2$ to $0.64\lambda_2$.

In the optical element according to the aspect of the present disclosure, an in-plane retardation of the optically anisotropic layer having the laminated structure with respect to light having a wavelength $\lambda$ may be in a range of $0.36\lambda$ to $0.64\lambda$.

In the optical element according to the aspect of the present disclosure, it is preferable that the rod-like liquid crystal compound in the first optically anisotropic layer is twistedly aligned in a thickness direction of the first optically anisotropic layer according to a first twist property.

In the optical element according to the aspect of the present disclosure, it is preferable that the disk-like liquid crystal compound in the second optically anisotropic layer is twistedly aligned in a thickness direction of the second optically anisotropic layer according to a second twist property.

In the optical element according to the aspect of the present disclosure, the disk-like liquid crystal compound in the second optically anisotropic layer may be twistedly aligned in a thickness direction of the second optically anisotropic layer according to a second twist property, the first twist property and the second twist property may exhibit the same orientation, and the twisted alignment of the optical axis of the rod-like liquid crystal compound and the twisted alignment of the optical axis of the disk-like liquid crystal compound may be continuous twisted alignment in the first optically anisotropic layer and the second optically anisotropic layer.

In the optical element according to the aspect of the present disclosure, the disk-like liquid crystal compound in the second optically anisotropic layer may be twistedly aligned in a thickness direction of the second optically anisotropic layer according to a second twist property, the first twist property and the second twist property may exhibit opposite orientation.

Alternatively, in the optical element according to the aspect of the present disclosure, the rod-like liquid crystal compound in the first optically anisotropic layer and the disk-like liquid crystal compound in the second optically anisotropic layer may be continuously cholesterically aligned in a thickness direction.

Further, in the optical element according to the aspect of the present disclosure, the rod-like liquid crystal compound in the first optically anisotropic layer may exhibit first cholesteric alignment in a thickness direction, and the disk-like liquid crystal compound in the second optically anisotropic layer may exhibit second cholesteric alignment in a thickness direction.

In the optical element according to the aspect of the present disclosure, it is possible to obtain diffracted light and simultaneously allow light having a wavelength different from the wavelength band of the diffracted light to be transmitted without influence of birefringence.

DESCRIPTION OF THE PREFERRED EMBODIMENTS

Hereinafter, embodiments of an optical element according to the present invention will be described with reference to the accompanying drawings. Further, in each drawing, the scales of constituent elements are differentiated from the actual scales as appropriate in order to facilitate visual recognition. Further, the numerical ranges shown using "to" in the present specification indicate ranges including numerical values described before and after "to" as the lower limits and the upper limits. In regard to the angles, the terms "orthogonal" and "parallel" each indicate a range of a strict angle±10°.

Figure 1:
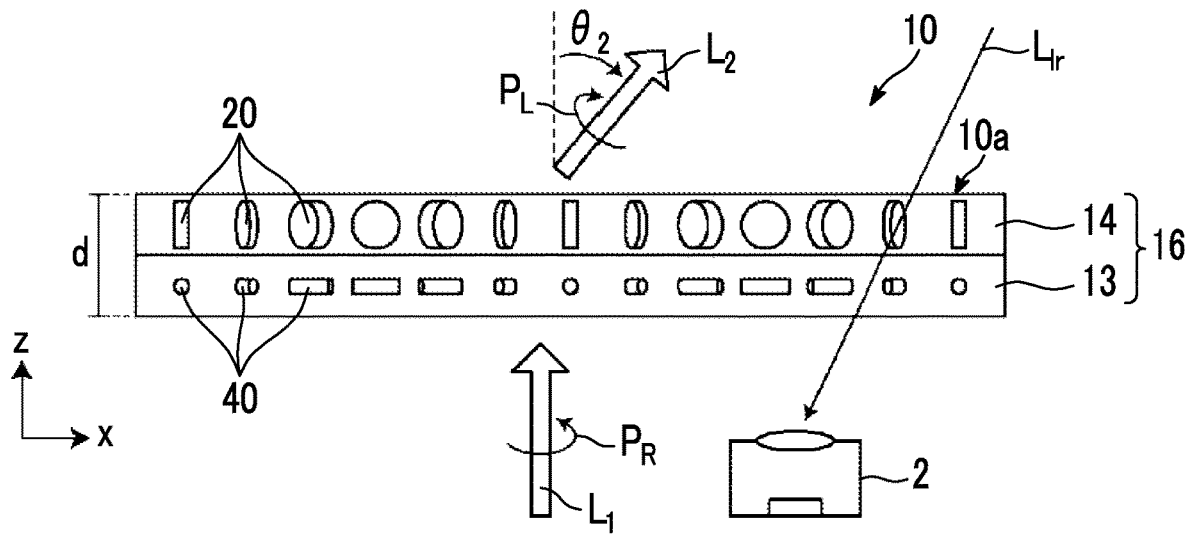
FIG. 1 is a schematic side view illustrating a liquid crystal alignment pattern in an optically anisotropic layer of an optical element according to a first embodiment.
Figure 2:
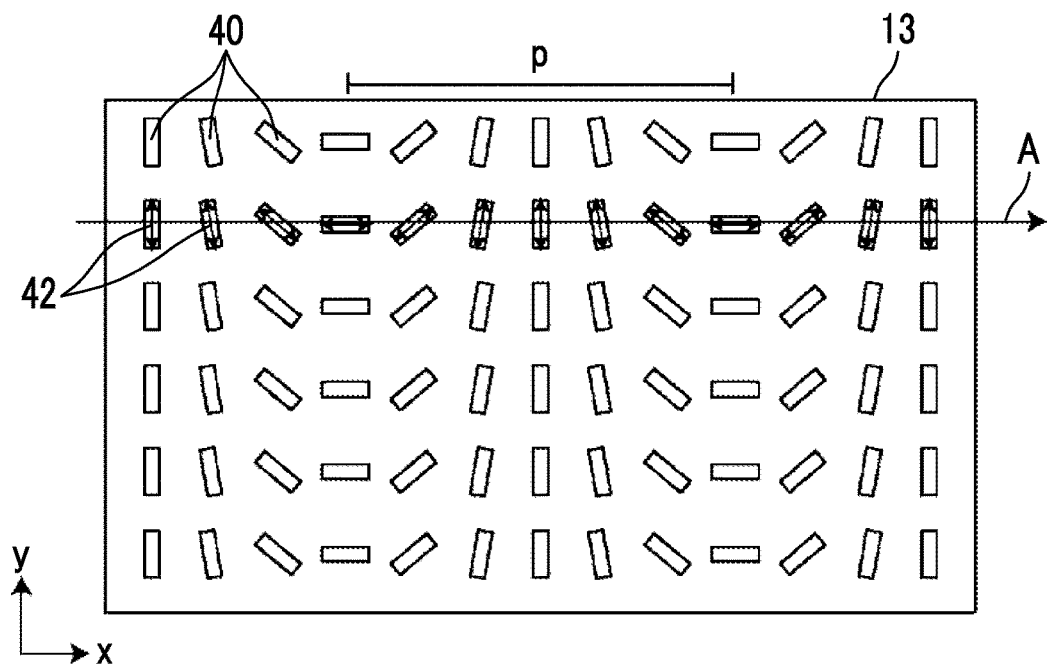
FIG. 2 is a schematic plan view illustrating the liquid crystal alignment pattern in a first optically anisotropic layer of the optical element according to the first embodiment.
Figure 3:
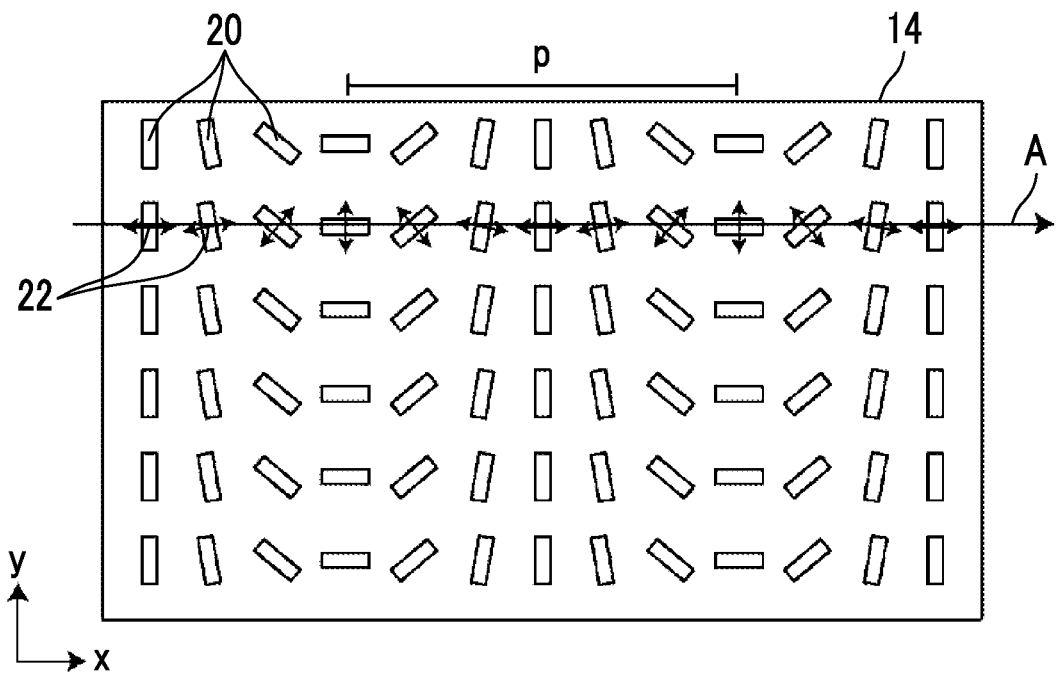
FIG. 3 is a schematic plan view illustrating the liquid crystal alignment pattern in a second optically anisotropic layer of the optical element according to the first embodiment.

FIG. 1 is a schematic side view illustrating a liquid crystal alignment pattern in an optical element 10 according to a first embodiment, and FIG. 2 is a schematic plan view illustrating the liquid crystal alignment pattern of a first optically anisotropic layer 13 of the optical element 10 illustrated in FIG. 1. Further, FIG. 3 is a schematic plan view illustrating a liquid crystal alignment pattern of a second optically anisotropic layer 14 of the optical element 10. In the drawings, a sheet surface of the sheet-like optical element 10 is defined as an x-y surface, and the thickness direction thereof is defined as a z direction.

The optical element 10 comprises a first optically anisotropic layer 13 which is a cured layer of a liquid crystal composition containing a rod-like liquid crystal compound 40, and a second optically anisotropic layer 14 which is a cured layer of a liquid crystal composition containing a disk-like liquid crystal compound 20. That is, the optical element 10 comprises an optically anisotropic layer 16 having a laminated structure of the first optically anisotropic layer 13 and the second optically anisotropic layer 14.

As illustrated in FIG. 2, the first optically anisotropic layer 13 has a first liquid crystal alignment pattern in which an optical axis 42 of the rod-like liquid crystal compound 40 is parallel to a surface of the first optically anisotropic layer 13, the first optically anisotropic layer 13 is disposed along at least one in-plane direction of the first optically anisotropic layer 13, and orientation of the optical axis 42 of the rod-like liquid crystal compound 40 changes rotationally. In addition, the orientation of the optical axis 42 of the rod-like liquid crystal compound 40 constituting the first liquid crystal alignment pattern rotates by 180° with a period of 0.5 μm to 5 μm.

As illustrated in FIG. 3, the second optically anisotropic layer 14 has a second liquid crystal alignment pattern in which an optical axis 22 of the disk-like liquid crystal compound 20 is parallel to a surface of the second optically anisotropic layer 14, the second optically anisotropic layer 14 is disposed along at least one in-plane direction of the second optically anisotropic layer 14, and orientation of the optical axis 22 of the disk-like liquid crystal compound 20 changes rotationally. In addition, the orientation of the optical axis 22 of the disk-like liquid crystal compound 20 constituting the liquid crystal alignment pattern rotates by 180° with a period of 0.5 μm to 5 μm.

The optical axis 42 in the rod-like liquid crystal compound 40 is a slow axis, and the optical axis 22 in the disk-like liquid crystal compound 20 is a fast axis. In the optical element 10, an in-plane slow axis of the rod-like liquid crystal compound 40 and an in-plane slow axis of the disk-like liquid crystal compound 20 are parallel to each other.

In the optical element 10 according to the present embodiment, an in-plane retardation R ($=\Delta n \cdot d$) of the optically anisotropic layer 16 having a laminated structure with respect to light having a wavelength $\lambda$ is preferably in a range of $0.36\lambda$ to $0.64\lambda$. The in-plane retardation R is preferably in a range of $0.4\lambda$ to $0.6\lambda$, more preferably in a range of $0.45\lambda$ to $0.55\lambda$, and particularly preferably $0.5\lambda$. Further, $\Delta n$ represents the birefringence of the optically anisotropic layer 16, and d represents the thickness of the optically anisotropic layer 16. For example, in a case where light having a wavelength of 550 nm is assumed as an incidence ray, the in-plane retardation R with respect to light having a wavelength of 550 nm may be in a range of 198 nm to 352 nm and particularly preferably 275 nm. Since the retardation R is in the above-described range, the optically anisotropic layer 16 exhibits a function as a typical $\lambda/2$ plate, that is, a function of providing a phase difference of 180° ($=\pi=\lambda/2$) between linear polarization components to which the incidence ray is orthogonal. Further, it is preferable that the in-plane retardation is closer to $\lambda/2$ from the viewpoint that the diffraction efficiency is improved, but the in-plane retardation is not limited to the above-described range.

The optical element 10 functions as a transmission type diffraction lattice. The principle of functioning as a diffraction lattice will be described.

As illustrated in FIGS. 1 and 2, in the first optically anisotropic layer 13, the rod-like liquid crystal compound 40 is fixed by a liquid crystal alignment pattern in which the rod-like liquid crystal compound 40 changes continuously and rotationally in one direction (the direction along an axis A in FIG. 2). That is, a long axis of the rod-like liquid crystal compound 40 which is defined as the optical axis 42 of the rod-like liquid crystal compound 40, is aligned to be parallel to the surface, and the rod-like liquid crystal compound 40 is aligned such that an angle between the axis A and the optical axis 42 of the rod-like liquid crystal compound 40 disposed along the axis A changes rotationally.

As illustrated in FIGS. 1 and 3, in the second optically anisotropic layer 14, the disk-like liquid crystal compound 20 is fixed by a liquid crystal alignment pattern in which the disk-like liquid crystal compound 20 changes continuously and rotationally in one direction (the direction along the axis A in FIG. 2) in a state where a disk surface thereof rises in a direction (z-axis direction) perpendicular to the surface of the optically anisotropic layer 14. That is, a short axis of the disk-like liquid crystal compound 20 (an axis of the extraordinary light: director), which is defined as an optical axis 22 of the disk-like liquid crystal compound 20, is aligned to be parallel to the surface, and the disk-like liquid crystal compound 20 is aligned such that an angle between an axis A and the optical axis 22 of the disk-like liquid crystal compound 20 disposed along the axis A rotates and changes.

The liquid crystal alignment pattern in which the orientation of the optical axis 42 changes rotationally is a pattern in which the angle between the axis A and the optical axis 42 of the rod-like liquid crystal compound 40 disposed along the axis A varies depending on the position in the axis A direction and the liquid crystal alignment pattern is aligned and fixed such that the angle between the axis A and the optical axis 42 disposed along the axis A gradually changes from $\varphi$ to $\varphi+180°$ or $\varphi-180°$.

Similarly, the liquid crystal alignment pattern in which the orientation of the optical axis 22 changes rotationally is a pattern in which the angle between the axis A and the optical axis 22 of the disk-like liquid crystal compound 20 disposed along the axis A varies depending on the position in the axis A direction and the liquid crystal alignment pattern is aligned and fixed such that the angle between the axis A and the optical axis 22 disposed along the axis A gradually changes from $\varphi$ to $\varphi+180°$ or $\varphi-180°$. Hereinafter, in the optically anisotropic layer as illustrated in FIGS. 2 and 3, a pattern in which optical axes are arranged such that the orientation of the optical axes changes continuously and rotationally in one direction among a plurality of local regions (unit regions) arranged in one direction, in which optical axes of liquid crystal compounds are parallel to the surface of the optically anisotropic layer and the orientation of the optical axes is constant, is referred to as a horizontal rotational alignment pattern.

Here, as illustrated in FIGS. 1 to 3, continuous rotation and change may be made by adjacent regions rotating at a constant angle of every 30° from 0° to 180° (=0°). The change is gradual in a case where the average value of the orientations of the optical axes in the unit range is linearly changed at a constant rate. Here, a change in inclination of the optical axes in regions that are adjacent to each other in the axis A direction and have different inclinations is set to 45° or less. However, it is preferable that the change in inclination of adjacent regions decreases.

In the A-axis direction, the distance at which the angle between the optical axis 22 and the A axis changes from $\varphi$ to $\varphi+180°$ or $\varphi-180°$ (returns to the original position) is a period p of 180° rotation (hereinafter, referred to as a rotation period p). The rotation period p of the orientation of the optical axis is in a range of 0.5 μm to 5 μm as described above. Further, the rotation period p may be determined according to the wavelength of the incidence ray on the optical element and the desired emission angle.

In the optical element 10 illustrated in FIG. 1, the rotation period of the horizontal rotational alignment in the first optically anisotropic layer 13 and the rotation period of the horizontal rotational alignment in the second optically anisotropic layer 14 are substantially the same as each other, but both the rotation periods may be different from each other.

The optical element 10 imparts a phase difference of $\lambda/2$ to the incidence ray with the configuration of the above-described optically anisotropic layer 16 and emits the incidence ray which has been incident at an incidence angle of 0°, that is, the incidence ray which has been perpendicularly incident at an emission angle $\theta_2$. That is, as illustrated in FIG. 1, in a case where light $L_1$ of right circularly polarized light $P_R$ (hereinafter, referred to as an incidence ray $L_1$) is incident perpendicularly (along the normal line of the surface) to one surface of the optically anisotropic layer 16, light $L_2$ of left circularly polarized light $P_L$ (hereinafter, referred to as emitted light $L_2$) is emitted in a direction forming an angle $\theta_2$ from the other surface of the optically anisotropic layer 16 in the normal direction. In a case where light having a predetermined wavelength is incident on the optical element 10, the emission angle of the emitted light $L_2$ increases as the rotation period p in the optically anisotropic layer 16 decreases.

Figure 4:
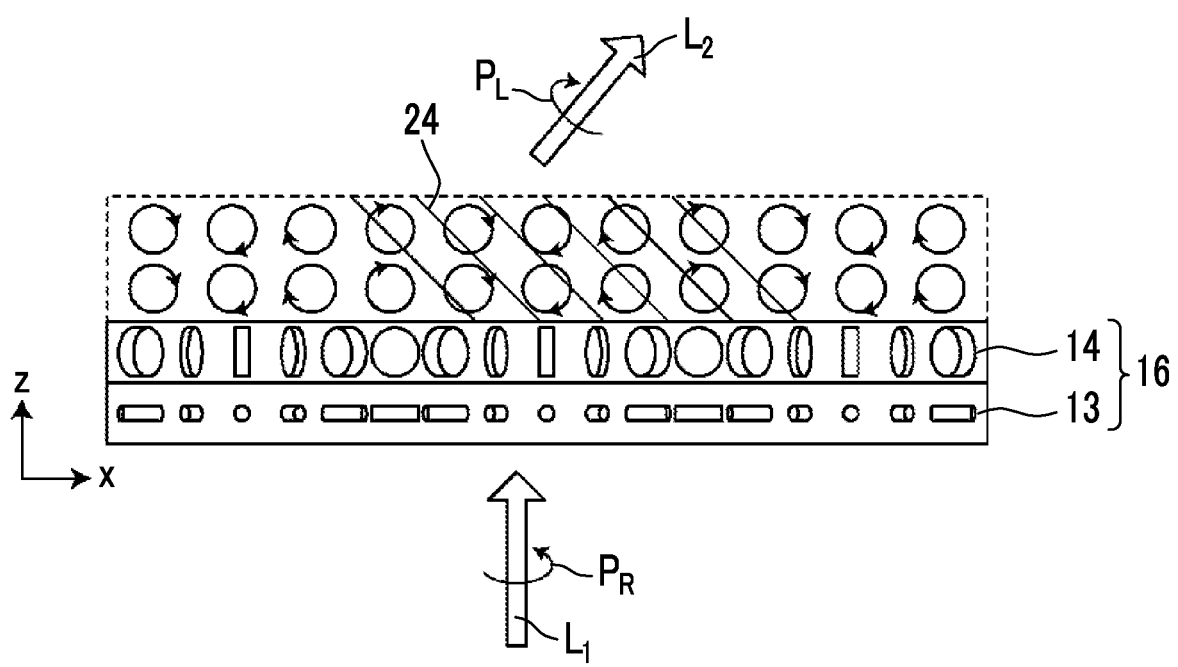
FIG. 4 is a view for explaining the principle that the optically anisotropic layer functions as a diffraction lattice.

FIG. 4 is a view schematically illustrating the principle that the incidence ray $L_1$ perpendicularly incident on the optical element 10 is emitted at a predetermined emission angle $\theta_2$. Hereinafter, the description will be made with reference to FIG. 4.

First, a case where right circularly polarized light $P_R$ having a wavelength $\lambda$ is used as the incidence ray $L_1$ will be described.

By allowing the incidence ray $L_1$ that is right circularly polarized light $P_R$ to pass through the optically anisotropic layer 16, a phase difference of $\lambda/2$ is provided so that the incidence ray $L_1$ is converted into left circularly polarized light $P_L$. In the optically anisotropic layer 16, the absolute phase of the incidence ray $L_1$ is changed due to the optical axis 42 of the rod-like liquid crystal compound 40 and the optical axis 22 of the disk-like liquid crystal compound 20 in each region of the plane. Here, since the orientation of the optical axis 42 and the optical axis 22 changes rotationally in the A-axis direction (the x-axis direction in the present example), the amount of change in absolute phase varies depending on the orientation of the optical axis 42 and the optical axis 22 in the x coordinate on the surface (x-y surface) of the optically anisotropic layer 16 on which the incidence ray is incident. In the region indicated by the broken line in FIG. 4, a state in which the amount of change in absolute phase varies depending on the x coordinate is schematically illustrated. An equiphase surface 24 of the absolute phase having an angle with respect to the surface of the optically anisotropic layer is formed due to deviation of the absolute phase in a case of light passing through the optically anisotropic layer 16 as illustrated in FIG. 4. In this manner, a bending force is applied to the incidence ray $L_1$, which has been incident in the normal direction, in a direction perpendicular to the equiphase surface 24 so that the traveling direction of the incidence ray $L_1$ is changed. That is, the incidence ray $L_1$ that is right circularly polarized light $P_R$ is converted into left circularly polarized light $P_L$ after passing through the optically anisotropic layer 16 and is emitted from the optically anisotropic layer 16 as emitted light $L_2$ that travels in a direction forming a predetermined angle $\theta_2$ with the normal direction.

As described above, in the optical element 10, the incidence ray $L_1$ which has been perpendicularly incident on the surface of the optical element 10 along the normal direction is emitted as emitted light $L_2$ in a direction different from the normal direction.

The inclination of the emission angle can be changed by changing the rotation period p of the orientation of the optical axis in the liquid crystal alignment pattern in the optically anisotropic layer 16. Since a stronger bending force can be applied to incidence ray as the rotation period p decreases, the inclination can be increased.

As described above, the wave surface of the incidence ray can be changed by changing the amount of change in absolute phase using the liquid crystal alignment pattern in the optically anisotropic layer 16.

In a case where the optical element 10 has a liquid crystal alignment pattern having a uniform rotation period p in only one direction, the conversion of the incidence ray $L_1$ into the emitted light $L_2$ based on the above-described principle can be described as transmission diffraction. The optically anisotropic layer 16 functions as a transmission diffraction lattice with respect to the incidence ray $L_1$, and the incidence ray $L_1$ perpendicularly incident on the optically anisotropic layer 16 is transmitted and diffracted as transmitted diffracted light $L_2$ having a predetermined diffraction angle $\theta_2$. In this case, Equation (1) which is a general equation of light diffraction is satisfied.

$$n_2 \sin\theta_2 - n_1 \sin\theta_1 = m\lambda/p \quad \text{Equation (1)}$$

Here, $n_1$ represents the refractive index of a medium 1 on the incident surface side of the diffraction lattice (here, the optically anisotropic layer), $\theta_1$ represents the incidence angle, $n_2$ represents the refractive index of a medium 2 on the emission surface side of the diffraction lattice (here, the optically anisotropic layer), $\theta_2$ represents the diffraction angle (emission angle), $\lambda$ represents the wavelength, p represents the rotation period, and m represents the order of diffraction. Here, the maximum diffraction efficiency is set to be obtained by setting m to 1. Here, since the incidence angle $\theta_1$ is 0°, Equation (2) of "$n_2 \sin\theta_2 = \lambda/p$" is drawn from Equation (1).

Figure 5:
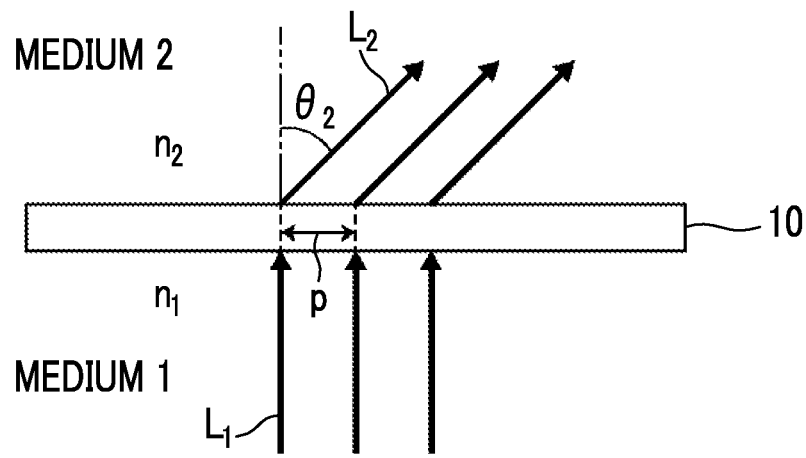
FIG. 5 is a view schematically illustrating a diffraction phenomenon in a diffraction lattice.

FIG. 5 is a view schematically illustrating the diffraction phenomenon represented by Equation (2).

The optically anisotropic layer 16 is disposed as a diffraction lattice between a medium $n_1$ and a medium $n_2$. The light $L_1$ incident on the optically anisotropic layer 16 from the medium 1 side having a refractive index $n_1$ in the normal direction is diffracted by a diffraction action of the optically anisotropic layer 16 and emitted to the medium 2 side having a refractive index $n_2$. Here, the emitted light $L_2$ emitted at an emission angle $\theta_2$ can be rephrased as transmitted diffracted light $L_2$ at a diffraction angle $\theta_2$.

In this manner, the optically anisotropic layer 16 functions as a diffraction lattice. Meanwhile, the first optically anisotropic layer 13 and the second optically anisotropic layer 14 each independently function as a diffraction lattice. In the description above, the optically anisotropic layer 16 can be replaced with the first optically anisotropic layer 13 or the second optically anisotropic layer 14.

The present inventors found that the optical element 10 comprising the optically anisotropic layer 16 obtained by laminating the first optically anisotropic layer 13 in which the rod-like liquid crystal compound 40 rotates and is aligned horizontally to be fixed and the optically anisotropic layer 14 in which the disk-like liquid crystal compound 20 rotates and is aligned horizontally to be fixed is capable of transmitting light having a wavelength different from the wavelength of diffracted light without influence of birefringence while maintaining the diffraction efficiency, as compared with a diffraction lattice that only uses an optically anisotropic layer in which a rod-like liquid crystal compound of the related art rotates and is aligned horizontally to be fixed and a diffraction lattice that only uses an optically anisotropic layer in which a disk-like liquid crystal compound rotates and is aligned horizontally.

The reason why the optical element 10 can obtain the above-described characteristics without influence of birefringence even on the wavelength different from the wavelength of diffracted light as compared with a diffraction lattice that only uses an optically anisotropic layer in which a rod-like liquid crystal compound of the related art rotates and is aligned horizontally to be fixed and a diffraction lattice that only uses an optically anisotropic layer in which a disk-like liquid crystal compound rotates and is aligned horizontally is assumed as follows.

In a case where light in a wavelength band different from the wavelength range of light to be diffracted (hereinafter, referred to as diffracted light) is incident on a liquid crystal diffraction lattice, the light travels straight and is transmitted therethrough without being affected by diffraction. For example, a liquid crystal diffraction lattice designed to diffract visible light does not affect infrared light by diffraction. Therefore, in a case where light having a wavelength different from the wavelength of diffracted light is obliquely incident on the liquid crystal diffraction lattice, the light travels straight obliquely and is transmitted therethrough. However, since the slow axis rotates in the plane of the diffraction lattice formed by the horizontal rotational alignment of the rod-like liquid crystal compound, the in-plane refractive index is larger than the refraction in the thickness direction. Therefore, the diffraction lattice acts as an approximately negative C plate (nx=ny>nz). Accordingly, the oblique light is subjected to retardation. Similarly, since the fast axis rotates in the plane of the diffraction lattice formed by the horizontal rotational alignment of the disk-like liquid crystal compound, the in-plane refractive index is smaller than the refraction in the thickness direction. Therefore, the diffraction lattice acts as an approximately positive C plate (nx=ny<nz). Accordingly, the oblique light is subjected to retardation.

However, it is considered that since the optical element 10 has a configuration in which the diffraction lattice formed by horizontal rotational alignment of the rod-like liquid crystal compound and the diffraction lattice formed by the horizontal rotational alignment of the disk-like liquid crystal compound are laminated on each other, the approximately negative and positive C plates compensate each other to eliminate the retardation in the oblique direction. In this manner, it is possible to provide an optical element that is capable of transmitting light having a wavelength different from the wavelength of diffracted light without influence of birefringence. In a case where such an optical element is used and light that is obliquely incident from the surface side of the optical element 10 which emits diffracted light, for example, the diffracted light is visible light as illustrated in FIG. 1, infrared light $L_{Ir}$ which is light in a wavelength band different from the wavelength band of the diffracted light is transmitted without influence of diffraction and without influence of birefringence in the optical element 10. Therefore, the infrared light $L_{Ir}$ can be detected with a small detection error using a detection sensor 2 disposed on one surface side of the optical element 10.

Figure 6:
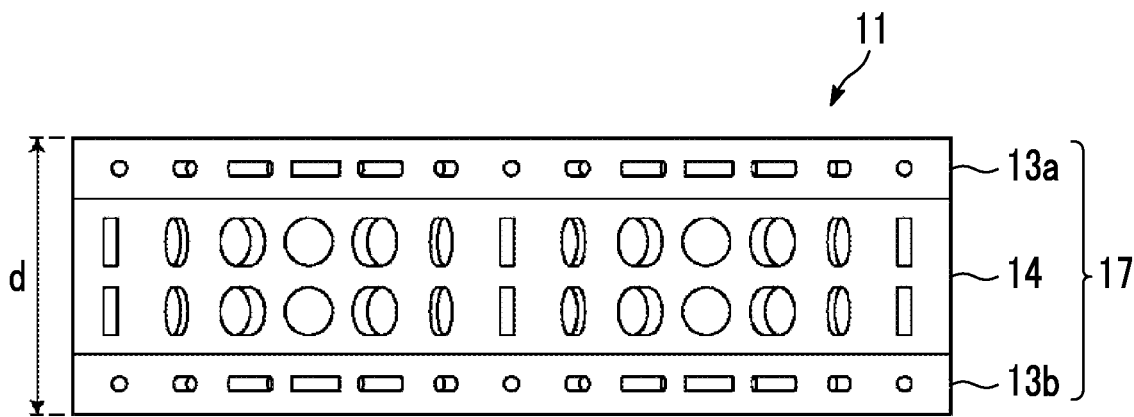
FIG. 6 is a schematic side view illustrating a laminated structure of a design change example of the optical element according to the first embodiment.

Further, in a case where the first optically anisotropic layer and the second optically anisotropic layer can mutually compensate each other so that the retardation with respect to an oblique incidence ray does not occur, the number of the first optically anisotropic layer and the number of the second optically anisotropic layer are not respectively limited to one layer. For example, as in a case of an optical element 11 of a design change example illustrated in FIG. 6, an optically anisotropic layer 17 having a laminated structure in which a second optically anisotropic layer 14 is interposed between two layers of first optically anisotropic layers 13a and 13b may be employed. Further, a plurality of first optically anisotropic layers and second optically anisotropic layers may be alternately laminated on one another.

The wavelength λ of light that allows the optical element according to the embodiment of the present disclosure to generate a diffraction action may be in a range from ultraviolet to infrared and furthermore, at an electromagnetic wave level. For the same rotation period p, the diffraction angle increases as the wavelength of the incidence ray increases, and the diffraction angle decreases as the wavelength of the incidence ray decreases. In a case where the wavelength λ is 380 nm, higher diffraction efficiency can be obtained as compared with the case of the rod-like liquid crystal compound in a case where the rotation period p (μm) satisfies a range of 0.5<p<1. Further, in a case where the wavelength λ is 1100 nm, higher diffraction efficiency can be obtained as compared with the case of the rod-like liquid crystal compound in a case where the rotation period p (μm) satisfies a range of 2<p<5.

Further, in a case where the center wavelength of light that generates the diffraction action is set as λ, the 1st-order diffraction efficiency is maximized in a case where the wavelength band different from the wavelength band of light that generates the diffraction action is a wavelength band of 1.0λ and the diffraction action decreases in a case where the wavelength band is in a wavelength range of 1.5λ or greater or 0.6λ or less.

As described above, in a case where the light $L_1$ of the right circularly polarized light $P_R$ is incident along the normal line on the surface of the optical element 10, the light $L_2$ of the left circularly polarized light $P_L$ is emitted in a direction forming an angle $\theta_2$ with the normal direction, as illustrated in FIG. 1. Meanwhile, in a case where the left circularly polarized light is incident on the optical element 10 as the incidence ray, the incidence ray is converted into right circularly polarized light in the optically anisotropic layer 16 and receives a bending force in an orientation opposite to that of FIG. 1 so that the traveling direction is changed.

Figure 7:
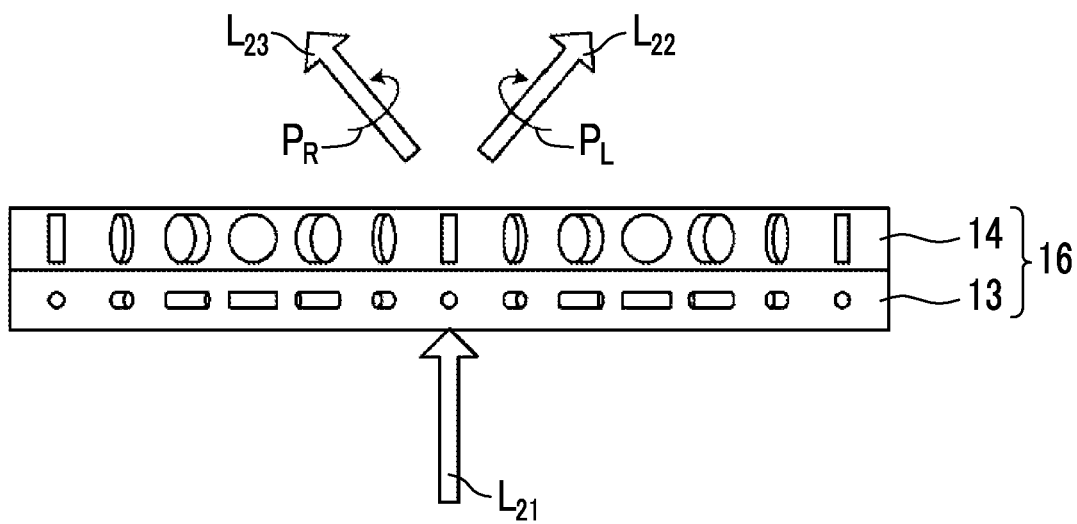
FIG. 7 is a view illustrating emitted light in a case where an incidence ray of randomly polarized light is incident on the optical element according to the first embodiment.

As illustrated in FIG. 7, in a case where an incidence ray $L_{21}$ of randomly polarized light (that is, non-polarized light) is incident on the optical element 10, right circularly polarized light $P_R$ among the incidence ray $L_{21}$ receives a bending force due to the liquid crystal alignment pattern so that the traveling direction is changed, is transmitted through the optically anisotropic layer, and is emitted as first transmitted diffracted light $L_{22}$. By allowing the right circularly polarized light $P_R$ to pass through the optically anisotropic layer 16, the right circularly polarized light $P_R$ is converted into left circularly polarized light $P_L$ and emitted. The left circularly polarized light $P_L$ among the incidence ray $L_{21}$ is transmitted through the optically anisotropic layer 16 in a state in which the left circularly polarized light receives a bending force in an orientation opposite to that of the light converted from right circularly polarized light to left circularly polarized light so that the traveling direction is changed, and the left circularly polarized light is emitted as second transmitted diffracted light $L_{23}$ from the surface opposite to the optical element 10. The left circularly polarized light $P_L$ is converted into right circularly polarized light $P_R$ by the optically anisotropic layer 16 and emitted. In a case where the periods of the horizontal rotational alignments in the first optically anisotropic layer and the second optically anisotropic layer are the same as each other, the traveling directions of the first transmitted diffracted light $L_{22}$ and the second transmitted diffracted light $L_{23}$ have an approximately line symmetrical relationship with respect to the normal line.

Figure 8:
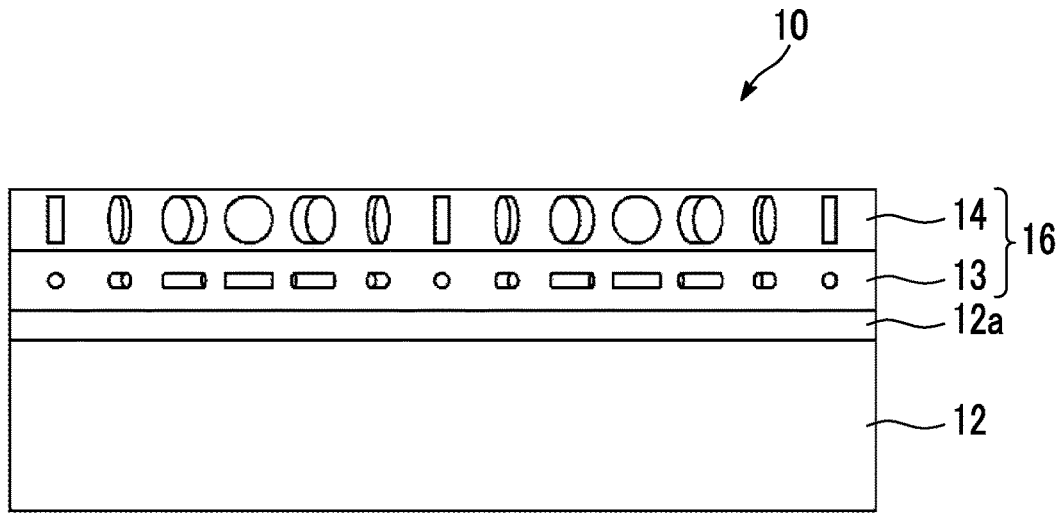
FIG. 8 is a schematic side view illustrating a laminated structure of another design change example of the optical element according to the first embodiment.

Further, as illustrated in FIG. 8, the optical element 10 may be configured to comprise an alignment film 12a on a support 12 and the optically anisotropic layer 16 thereon.

In the optical element according to the embodiment of the present disclosure, the above-described 180° rotation period in the optically anisotropic layer does not need to be uniform over the entire surface. Further, the optical element may have the liquid crystal alignment pattern in a portion, in which the orientation of the optical axis rotates in at least one in-plane direction (A axis) of the optically anisotropic layer, and may comprise a portion where the orientation of the optical axis is constant.

In the description above, the example in which the incidence ray is perpendicularly incident on the optically anisotropic layer has been described. However, in a case where the incidence ray is oblique, the effect of transmission diffraction can be similarly obtained. In a case of oblique incidence, the rotation period may be designed such that Equation (1) is satisfied in consideration of the incident angle $\theta_1$ to obtain a desired diffraction angle $\theta_2$.

As in the optically anisotropic layer 16 of the optical element 10 illustrated in FIGS. 1 to 3, in a case where the liquid crystal alignment pattern in which the optical axis parallel to the surface changes rotationally with a constant 180° rotation period in one in-plane direction is uniformly comprised in the plane, the emission direction is determined to a single direction.

Further, in the liquid crystal alignment pattern, the direction in which the optical axis changes rotationally is not limited to one direction and may be two directions or a plurality of directions. By using the optically anisotropic layer 16 comprising the liquid crystal alignment pattern according to the orientation of desired reflected light, the incidence ray can be reflected in a desired direction.

Figure 9:
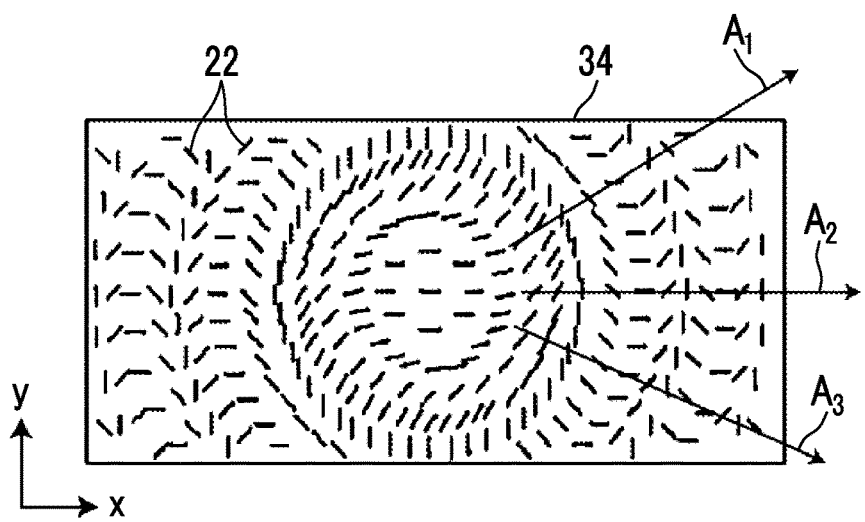
FIG. 9 is a schematic plan view illustrating a horizontal rotational alignment pattern in still another design change example of the optical element.

FIG. 9 is a schematic plan view illustrating an optically anisotropic layer 34 in a design change example of the optical element. The liquid crystal alignment pattern in the optically anisotropic layer 34 is different from the liquid crystal alignment pattern in the optically anisotropic layer 16 according to the embodiment. FIG. 9 illustrates only the optical axis 22. The optically anisotropic layer 34 of FIG. 9 has a liquid crystal alignment pattern in which the orientation of the optical axis 22 gradually changes rotationally along, for example, axes $A_1$, $A_2$, $A_3$, . . . , and so on in multiple directions from the center side to the outside. The absolute phase of the incidence ray changes in different amounts of change between local regions where the orientation of the optical axis 22 varies due to the liquid crystal alignment pattern illustrated in FIG. 9. In a case where the optical element comprises the liquid crystal alignment pattern in which the optical axis changes radially rotationally as illustrated in FIG. 9, light can be reflected as divergent light or focused light. That is, the function as a concave lens or a convex lens can be realized by the liquid crystal alignment pattern in the optically anisotropic layer.

According to the first embodiment, the in-plane retardation R (=Δn·d) is preferably in a range of 0.36λ to 0.64λ as the entire optically anisotropic layer obtained by laminating the first optically anisotropic layer and the second optically anisotropic layer. However, the first optically anisotropic layer and the second optically anisotropic layer may be designed to function as a diffraction lattice for wavelengths $\lambda_1$ and $\lambda_2$ which are different from each other. In such a case, the in-plane retardation in the first optically anisotropic layer and the in-plane retardation in the second optically anisotropic layer are set independently.

Figure 10:
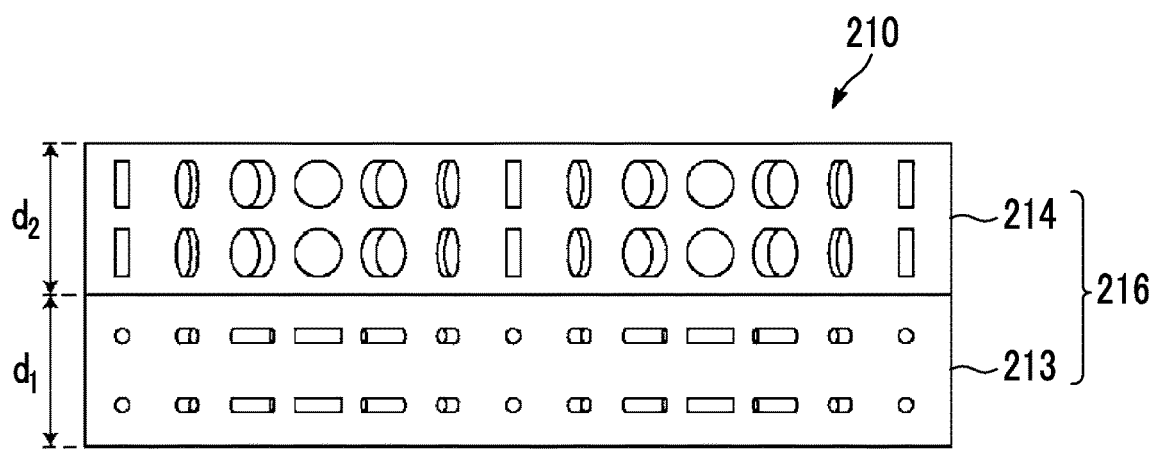
FIG. 10 is a schematic side view illustrating an optical element according to a second embodiment.

FIG. 10 is a schematic side view illustrating the optical element 210 according to a second embodiment.

The optical element 210 comprises an optically anisotropic layer 216 having a laminated structure in which a first optically anisotropic layer 213 which is a cured layer of a liquid crystal composition containing the rod-like liquid crystal compound 40 and a second optically anisotropic layer 214 which is a cured layer of a liquid crystal composition containing a disk-like liquid crystal compound 20 are laminated on each other.

The first optically anisotropic layer 213 and the second optically anisotropic layer 214 have a liquid crystal alignment pattern which is the same as the horizontal rotational alignment pattern of the first optically anisotropic layer 13 and the second optically anisotropic layer 14 in the optical element 10 according to the first embodiment. However, the first optically anisotropic layer 213 and the second optically anisotropic layer 214 each function as a diffraction lattice for different wavelengths $\lambda_1$ and $\lambda_2$.

In the first optically anisotropic layer 213, an in-plane retardation R (=$\Delta n_1 \cdot d_1$) with respect to light having a first wavelength $\lambda_1$ may be in a range of $0.36\lambda_1$ to $0.64\lambda_1$. The in-plane retardation R is preferably in a range of $0.4\lambda_1$ to $0.6\lambda_1$, more preferably in a range of $0.45\lambda_1$ to $0.55\lambda_1$, and particularly preferably $0.5\lambda_1$. $\Delta n_1$ represents the birefringence of the first optically anisotropic layer 213, and $d_1$ represents the thickness of the first optically anisotropic layer 213. For example, in a case where light having a wavelength of 550 nm is assumed as an incidence ray, the in-plane retardation R with respect to light having a wavelength of 550 nm may be in a range of 198 nm to 352 nm and particularly preferably 275 nm. Since the retardation R is in the above-described range, the first optically anisotropic layer 213 has a function as a typical λ/2 plate, that is, a function of providing a phase difference of 180° (=π=λ/2) between linear polarization components to which the incidence ray is orthogonal.

In the second optically anisotropic layer 214, an in-plane retardation R (=$\Delta n_2 \cdot d_2$) with respect to light having a second wavelength $\lambda_2$ is preferably in a range of $0.36\lambda_2$ to $0.64\lambda_2$. The in-plane retardation R is preferably in a range of $0.4\lambda_2$ to $0.6\lambda_2$, more preferably in a range of $0.45\lambda_2$ to $0.55\lambda_2$, and particularly preferably $0.5\lambda_2$. $\Delta n_2$ represents the birefringence of the second optically anisotropic layer 214, and $d_2$ represents the thickness of the second optically anisotropic layer 214. For example, in a case where light having a wavelength of 550 nm is assumed as an incidence ray, the in-plane retardation R with respect to light having a wavelength of 550 nm may be in a range of 198 nm to 352 nm and particularly preferably 275 nm. Since the retardation R is in the above-described range, the second optically anisotropic layer 214 has a function as a typical λ/2 plate, that is, a function of providing a phase difference of 180° (=π=λ/2) between linear polarization components to which the incidence ray is orthogonal.

Further, the rotation period of the horizontal rotational alignment pattern in the first optically anisotropic layer 213 and the rotation period of the horizontal rotational alignment pattern in the second optically anisotropic layer 214 are may be respectively determined according to the angles at which light having a wavelength $\lambda_1$ and light having a wavelength $\lambda_2$ are intended to be diffracted.

Figure 11:
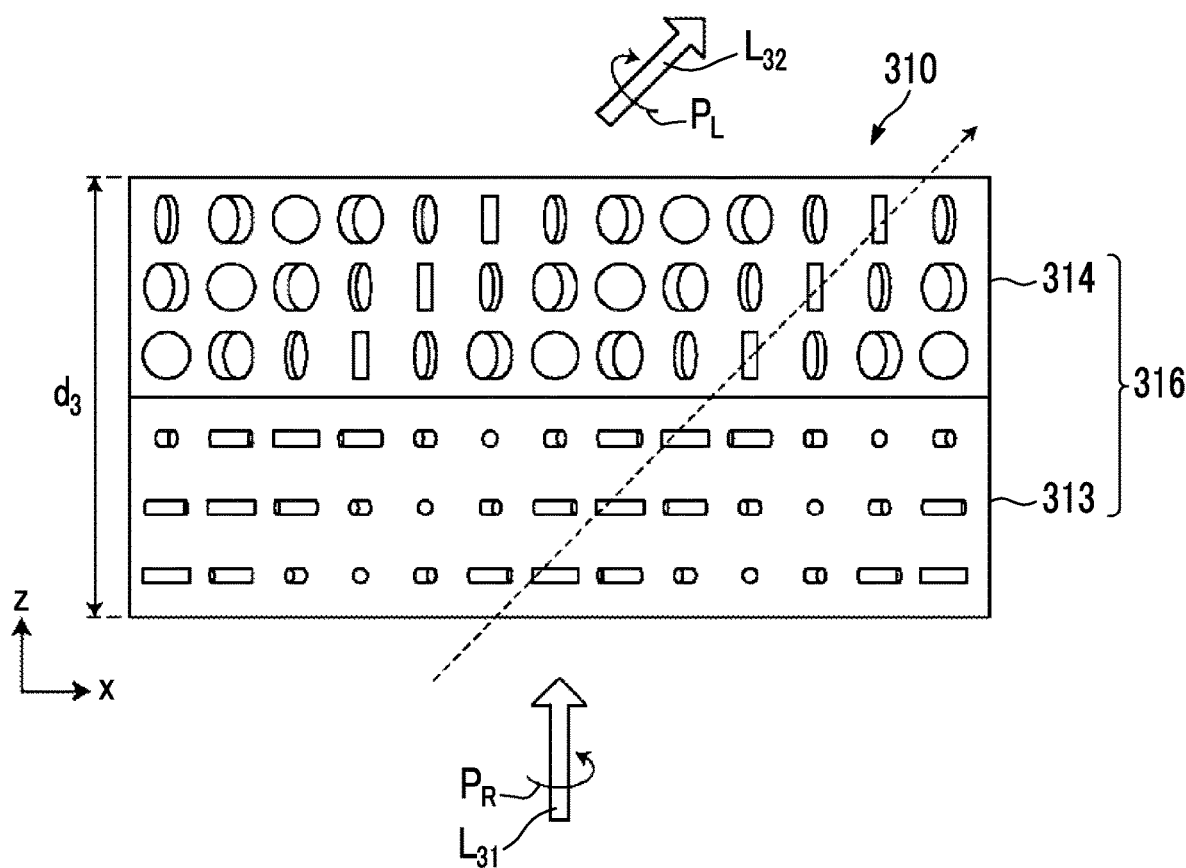
FIG. 11 is a schematic side view illustrating a liquid crystal alignment pattern in an optically anisotropic layer of an optical element according to a third embodiment.

FIG. 11 is a schematic side view illustrating a configuration of an optical element 310 according to a third embodiment of the present invention.

The optical element 310 according to the third embodiment comprises a first optically anisotropic layer 313 which is a cured layer of a liquid crystal composition containing a rod-like liquid crystal compound 40, and a second optically anisotropic layer 314 which is a cured layer of a liquid crystal composition containing a disk-like liquid crystal compound 20. That is, the optical element 310 comprises an optically anisotropic layer 316 having a laminated structure of the first optically anisotropic layer 313 and the second optically anisotropic layer 314.

The optical element 310 according to the present embodiment may also have a configuration in which an optically anisotropic layer is formed on an alignment film which has been formed on a support. Further, the liquid crystal alignment patterns in the plane of the first optically anisotropic layer 313 and the second optically anisotropic layer 314 of the optical element 310 according to the third embodiment are substantially the same as those of the optically anisotropic layers 13 and 14 according to the first embodiment, and the schematic plan views are respectively the same as the plan views illustrating the layers according to the first embodiment in FIGS. 2 and 3.

In the optical element 310, the liquid crystal alignment patterns of the optically anisotropic layers 313 and 314 in the thickness direction are different from those of the optically anisotropic layers 13 and 14 according to the first embodiment. In the optically anisotropic layers 313 and 314, the rod-like liquid crystal compound 40 and the disk-like liquid crystal compound 20 are twistedly aligned in the thickness direction according to the first twist property and the second twist property respectively. The "rod-like liquid crystal compound 40 is twistedly aligned in the thickness direction" indicates a state in which the orientation of the optical axes of a plurality of rod-like liquid crystal compounds 40 arranged in the thickness direction from one surface of the optically anisotropic layer 313 toward the other surface thereof relatively changes and is twistedly aligned in one direction. The "disk-like liquid crystal compound 20 is twistedly aligned in the thickness direction" means that the orientation of the optical axes of the plurality of disk-like liquid crystal compounds 20 arranged in the thickness direction from one surface of the optically anisotropic layer 314 to the other surface is relatively changed and is twistedly aligned in one direction. The twist property is classified into a right twist property and a left twist property and may be applied according to the polarization of light intended to be diffracted.

As described below, an optical element 510 according to a fifth embodiment is cholesterically aligned in the thickness direction and functions as a reflection type diffraction lattice that selectively reflects only light in a specific selected wavelength range of specific circularly polarized light. The cholesteric alignment is helical alignment in which the disk-like liquid crystal compound 20 or the rod-like liquid crystal compound 40 rotates in the thickness direction and rotates once or more times in the thickness direction. On the contrary, in the optically anisotropic layers 313 and 314, the twist of the disk-like liquid crystal compound or the rod-like liquid crystal compound in the thickness direction is less than one rotation, that is, the twist angle is less than 360°. For example, in the example of FIG. 11, the optical axes of the rod-like liquid crystal compound 40 and the disk-like liquid crystal compound 20 rotate by approximately 60° from one surface side to the other surface side in the thickness direction (z direction). The twist angles of the rod-like liquid crystal compound 40 and the disk-like liquid crystal compound 20 in the thickness direction are preferably in a range of 45° to 90°. Specific circularly polarized light in a specific wavelength range is reflected in a case of the cholesteric alignment, but reflection does not occur in a case of twisted alignment.

In the optically anisotropic layers 313 and 314 of the example illustrated in FIG. 11, the rod-like liquid crystal compound 40 and the disk-like liquid crystal compound 20 are aligned on the light emitting side from the light incident side in the thickness direction, that is, from the bottom toward the top on the paper surface so as to be left-twisted. In the present configuration, in the first optically anisotropic layer 313 and the second optically anisotropic layer 314, the rotation of the optical axes of the respective liquid crystal compounds is continuous. Since the disk-like liquid crystal compound 20 and the rod-like liquid crystal compound 40 rotates and is aligned horizontally in the plane and is left-twistedly aligned in the thickness direction, the optical element has an alignment pattern in which regions where the orientations of the optical axes are the same as one another are present in the direction indicated by the broken line arrow of FIG. 11.

An in-plane retardation R ($=\Delta n_3 \cdot d_3$) of the optically anisotropic layer 316 with respect to light having a wavelength $\lambda$ is preferably in a range of $0.36\lambda$ to $0.64\lambda$. The in-plane retardation R is preferably in a range of $0.4\lambda$ to $0.6\lambda$, more preferably in a range of $0.45\lambda$ to $0.55\lambda$, and particularly preferably $0.5\lambda$. Further, $\Delta n_3$ represents the birefringence of the optically anisotropic layer 316, and $d_3$ represents the thickness of the optically anisotropic layer 316. That is, similarly to the case of the optically anisotropic layer 16 according to the first embodiment, the optically anisotropic layer 316 functions as a $\lambda/2$ plate.

The optical element 310 in which the twist of the disk-like liquid crystal compound in the thickness direction is less than one rotation functions as a transmission type diffraction lattice, similarly to the optical element 10 according to the first embodiment. That is, the optical element 310 bends light, which has been incident from one surface, obliquely and emits the light as diffracted light from the other surface.

As illustrated in FIG. 11, in a case where light $L_{31}$ of right circularly polarized light $P_R$ (hereinafter, referred to as an incidence ray $L_{31}$) is incident on one surface of the optical element 310, the incidence ray $L_{31}$ is bent in one direction due to the action of the horizontal rotational alignment of the disk-like liquid crystal compound, and light $L_{32}$ of left circularly polarized light $P_L$ is emitted from the other surface due to the action of the $\lambda/2$ plate. Here, in a case where the orientation of the optical axis of the liquid crystal compound does not change in the thickness direction as in the optically anisotropic layer 16 according to the first embodiment, the incidence ray $L_{31}$ which has been bent in an oblique direction passes through sites with different amounts of change in absolute phase. Since the incidence ray $L_{31}$ passes through a site where the amount of change in absolute phase is different from the amount of change in initial absolute phase, deviation occurs in the traveling direction of the light, and thus diffraction loss is occurs. Meanwhile, in the present optically anisotropic layer 316, regions where the orientations of the optical axes of the disk-like liquid crystal compound are the same as one another in the direction indicated by the broken line arrow are present. In addition, since regions where the orientations of the optical axes are the same as one another in the traveling direction of the bent incidence ray $L_{71}$, the diffraction loss can be reduced, and the diffraction efficiency can be further increased. Further, it is preferable that the direction indicated by the broken line arrow and the traveling direction of the bent incidence ray $L_{71}$ match each other. However, both directions do not necessarily completely match each other. In a case where the direction in which the regions having the identical absolute phase are present is a direction which is inclined from the thickness direction and is closer to the traveling direction of the bent light than to the thickness direction, the effect of improving the diffraction efficiency is exhibited.

Further, in a case where an incidence ray of randomly polarized light is incident on the optical element 310, right circularly polarized light $P_R$ among the incidence ray receives a bending force due to the liquid crystal alignment pattern so that the traveling direction is changed, is transmitted through the optically anisotropic layer 316, and is emitted as first transmitted diffracted light. Here, the light is converted into left circularly polarized light $P_L$ in the optically anisotropic layer 316. In addition, the left circularly polarized light $P_L$ among the incidence ray has a bending force offset by the horizontal rotational alignment in the in-plane direction and the twisted alignment in the thickness direction, and the left circularly polarized light $P_L$ travels straight without being affected by the alignment pattern of the disk-like liquid crystal compound and is emitted as emitted light $L_{83}$. Further, the optically anisotropic layer does not generate the action of $\lambda/2$ with respect to the left circularly polarized light $P_L$, and the left circularly polarized light $P_L$ is emitted as the left circularly polarized light $P_L$. That is, the optical element 310 acts as a diffraction lattice and a $\lambda/2$ plate only for the right circularly polarized light $P_R$.

In a case of an optically anisotropic layer having a right twist property opposite to the twist property of the optically anisotropic layer 316 of FIG. 11, an alignment pattern in which regions where the orientations of the optical axes of the liquid crystal compound are the same as one another are present in a left obliquely upward direction is formed. Therefore, contrary to the optical element 310, in a case where the left circularly polarized light $P_L$ is incident, the incidence ray is bent and travels in a left obliquely upward direction on the paper surface, is affected by the $\lambda/2$ plate, and is emitted as transmitted diffracted light of right circularly polarized light $P_R$. Here, in a case where the right circularly polarized light $P_R$ is incident, the right circularly polarized light $P_R$ travels straight and is emitted as the right circularly polarized light $P_R$ without being affected by diffraction and $\lambda/2$.

Figure 12:
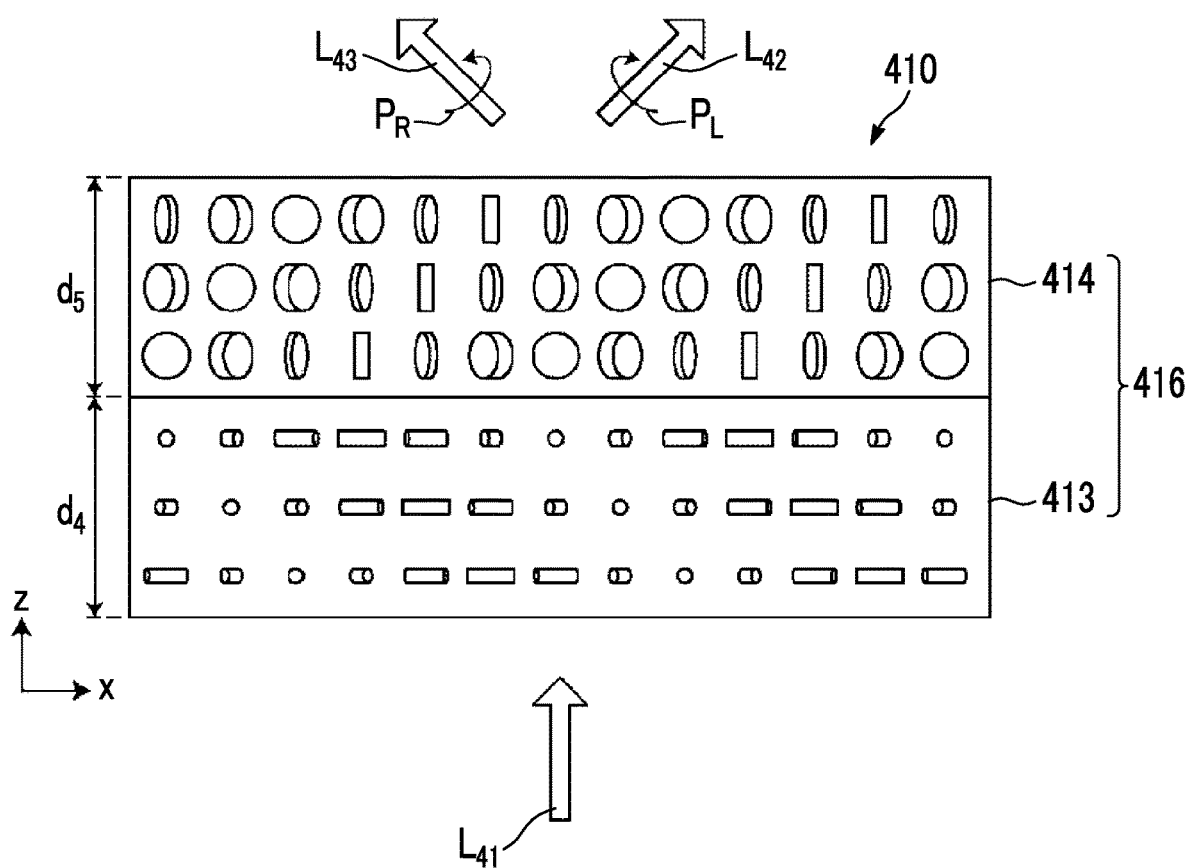
FIG. 12 is a schematic side view illustrating a liquid crystal alignment pattern in an optically anisotropic layer of an optical element according to a fourth embodiment.

FIG. 12 is a schematic side view illustrating a configuration of an optical element 410 according to a fourth embodiment of the present invention.

The optical element 410 according to the fourth embodiment comprises a first optically anisotropic layer 413 which is a cured layer of a liquid crystal composition containing a rod-like liquid crystal compound, and a second optically anisotropic layer 414 which is a cured layer of a liquid crystal composition containing a disk-like liquid crystal compound. That is, the optical element 410 comprises an optically anisotropic layer 416 in which the first optically anisotropic layer 413 and the second optically anisotropic layer 414 are laminated. The first optically anisotropic layer 413 and the second optically anisotropic layer 414 have a liquid crystal alignment pattern which is the same as the horizontal rotational alignment pattern of the first optically anisotropic layer 13 and the second optically anisotropic layer 14 in the optical element 10 according to the first embodiment.

The first optically anisotropic layer 413 and the second optically anisotropic layer 414 have twisted alignment in the thickness direction similarly to the optically anisotropic layers 313 and 314 of the optical element 310 of the third embodiment. In the first optically anisotropic layer 413, the first disk-like liquid crystal compound is twistedly aligned in the thickness direction according to the first twist property. In the second optically anisotropic layer 414, the second disk-like liquid crystal compound is twistedly aligned in the thickness direction according to the second twist property.

Further, the second twist property of the second optically anisotropic layer 414 and the first twist property of the first optically anisotropic layer 413 exhibit opposite orientation.

In the first optically anisotropic layer 413, an in-plane retardation R ($=\Delta n_4 \cdot d_4$) with respect to light having a first wavelength $\lambda_1$ may be in a range of $0.36\lambda_1$ to $0.64\lambda 1$. The in-plane retardation R is preferably in a range of $0.4\lambda_1$ to $0.6\lambda_1$, more preferably in a range of $0.45\lambda_1$ to $0.55\lambda_1$, and particularly preferably $0.5\lambda_1$. $\Delta n_4$ represents the birefringence of the first optically anisotropic layer 413, and $d_4$ represents the thickness of the first optically anisotropic layer 413.

In the second optically anisotropic layer 414, an in-plane retardation R ($=\Delta n_5 \cdot d_5$) with respect to light having a second wavelength $\lambda_2$ is preferably in a range of $0.36\lambda_2$ to $0.64\lambda_2$. The in-plane retardation R is preferably in a range of $0.4\lambda_2$ to $0.6\lambda_2$, more preferably in a range of $0.45\lambda_2$ to $0.55\lambda_2$, and particularly preferably $0.5\lambda_2$. $\Delta n_5$ represents the birefringence of the second optically anisotropic layer 414, and $d_5$ represents the thickness of the second optically anisotropic layer 414.

The first wavelength $\lambda_1$ and the second wavelength $\lambda_2$ may be the same as or different from each other. In the present example, the first wavelength $\lambda_1$ and the second wavelength $\lambda_2$ are the same as each other and each function as a $\lambda/2$ plate. In this case, the first optically anisotropic layer 413 and the second optically anisotropic layer 414 each independently act on the same wavelength $\lambda$ as a polarized light diffraction lattice.

The first optically anisotropic layer 413 functions as a diffraction lattice and functions as a $\lambda/2$ plate with respect to the incidence ray that is left circularly polarized light $P_L$. In addition, the first optically anisotropic layer 413 does not function as a diffraction lattice or a $\lambda/2$ plate with respect to the incidence ray that is right circularly polarized light $P_R$.

The second optically anisotropic layer 414 functions as a diffraction lattice and functions as a $\lambda/2$ plate with respect to the incidence ray that is right circularly polarized light $P_R$. In addition, the second optically anisotropic layer 414 does not function as a diffraction lattice or a $\lambda/2$ plate with respect to the incidence ray that is left circularly polarized light $P_L$.

The optically anisotropic layer 416 is a layer obtained by laminating the first optically anisotropic layer 413 and the second optically anisotropic layer 414 and comprises characteristics of both layers. Therefore, the first optically anisotropic layer 413 acts on the right circularly polarized light $P_R$, and the second optically anisotropic layer 414 acts on the left circularly polarized light $P_L$. Consequently, the incidence ray of the right circularly polarized light $P_R$ which has been perpendicularly incident from one surface of the optically anisotropic layer 416 is obliquely diffracted rightward and is emitted as the left circularly polarized light $P_L$ from the other surface thereof. The incidence ray of the left circularly polarized light $P_L$ which has been perpendicularly incident from one surface of the optically anisotropic layer 416 is diffracted obliquely leftward and is emitted as the right circularly polarized light $P_R$.

As illustrated in FIG. 12, a case where an incidence ray $L_{41}$ of randomly polarized light is perpendicularly incident on one surface of the optically anisotropic layer 416 will be described. In this case, a right circularly polarized light $P_R$ component among the incidence ray $L_{41}$ passes through the first optically anisotropic layer 413, receives a bending force in the second optically anisotropic layer 414 so that the traveling direction is changed, and is emitted from the other surface of the optically anisotropic layer 416 as first transmitted diffracted light $L_{42}$. By allowing the right circularly polarized light $P_R$ component among the incidence ray $L_{41}$ to pass through the second optically anisotropic layer 414, the right circularly polarized light $P_R$ component is converted into left circularly polarized light $P_L$ and then emitted.

Meanwhile, the left circularly polarized light $P_L$ component among the incidence ray $L_{41}$ is emitted from the second optically anisotropic layer 414 in a state where the left circularly polarized light $P_L$ component receives a bending force in the second optically anisotropic layer 413 so that the traveling direction is changed, and the light passes through the second optically anisotropic layer 414 while the diffraction state is maintained and is emitted from the other surface of the optically anisotropic layer 416 as second transmitted diffracted light $L_{43}$. Further, the left circularly polarized light $P_L$ component among the incidence ray $L_{41}$ is converted into the right circularly polarized light $P_R$ by the first optically anisotropic layer 413, passes through the second optically anisotropic layer 414 while the state is maintained, and is emitted. In the present example, the first optically anisotropic layer 413 and the second optically anisotropic layer 414 exhibit the twist properties which are opposite to each other in the thickness direction, but the alignment pitches of the horizontal rotational alignment are the same as each other. Accordingly, the traveling directions of the first transmitted diffracted light $L_{42}$ and the second transmitted diffracted light $L_{43}$ have an approximately line symmetrical relationship with respect to the normal line.

As described above, since the optical element comprises the first optically anisotropic layer and the second optically anisotropic layer having the twist properties exhibiting opposite orientation in the film thickness direction, both the right circularly polarized light $P_R$ and the left circularly polarized light $P_L$ can be diffracted with high diffraction efficiency.

In a case where the optical element 410 according to the fourth embodiment comprises the first optically anisotropic layer 413 and the second optically anisotropic layer 414, the period of 180° rotation of the horizontal rotational alignment of the rod-like liquid crystal compound in the first optically anisotropic layer 413 and the period of 180° rotation of the horizontal rotational alignment of the disk-like liquid crystal compound in the second optically anisotropic layer 414 may be the same as or different from each other. In a case where the rotation periods of the horizontal rotational alignment of both optically anisotropic layers are different from each other, diffracted light having different diffraction angles between left circularly polarized light and right circularly polarized light can be obtained.

Further, as in the optical elements according to the second embodiment and the third embodiment, the optical elements comprise an optically anisotropic layer which has twisted alignment in the thickness direction, and thus the wavelength of a diffractable incidence ray can be broadened.

Further, the broadening of the wavelength range can be realized not only by forming an optically anisotropic layer having twisted alignment in the thickness direction but also by forming the optically anisotropic layer using a liquid crystal material in which the birefringence shows inverse dispersion. Therefore, it is preferable that the optically anisotropic layer is formed using a liquid crystal material in which the birefringence shows inverse dispersion. Further, it is also preferable that the optically anisotropic layer has a substantially broadband with respect to the wavelength of the incidence ray by laminating different phase difference layers.

Figure 13:
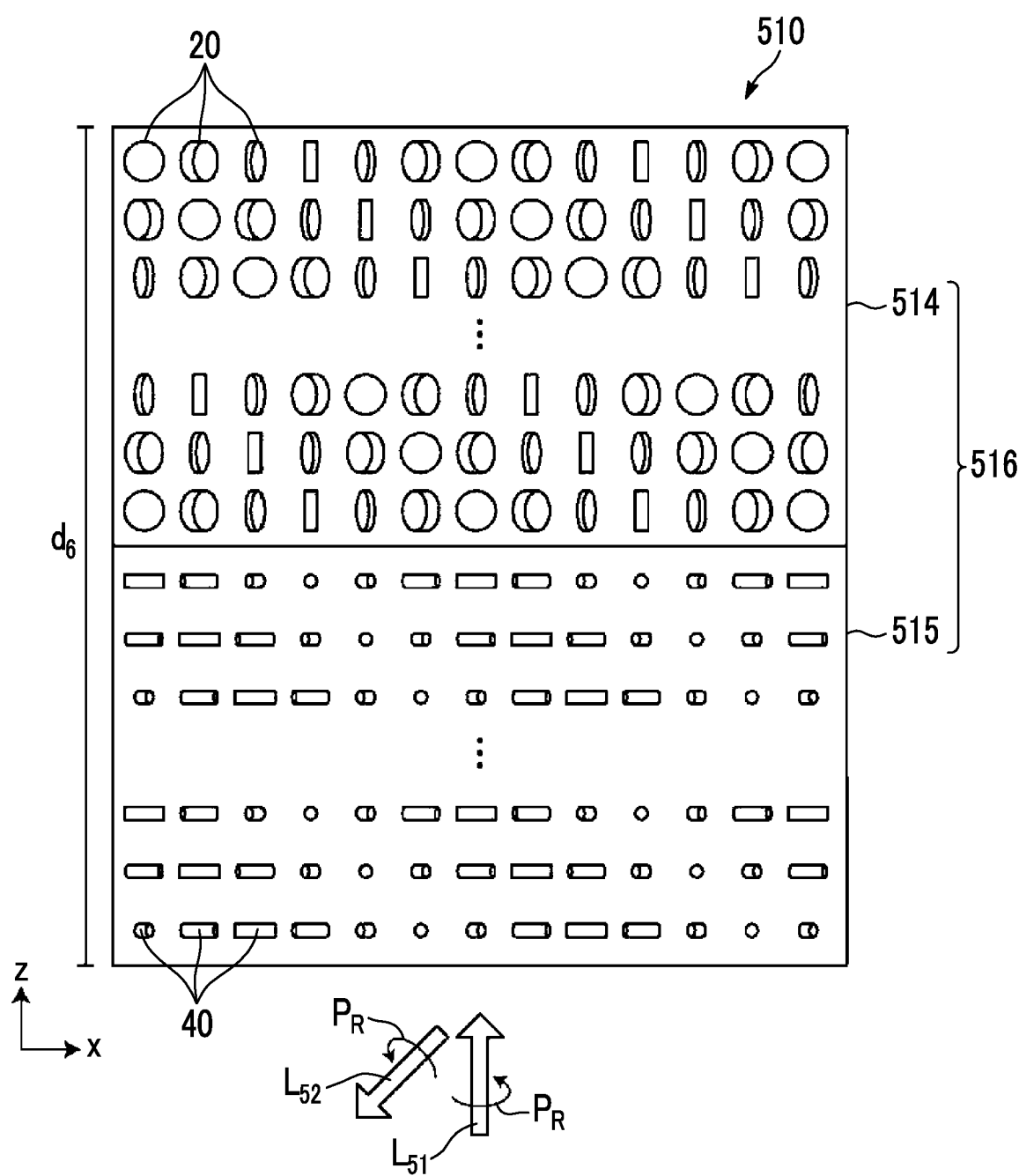
FIG. 13 is a schematic side view illustrating a liquid crystal alignment pattern in an optically anisotropic layer of an optical element according to a fifth embodiment.

FIG. 13 is a schematic side view illustrating a configuration of an optical element 510 according to a fifth embodiment of the present invention. Further, the schematic plan view of the liquid crystal alignment pattern in the optically anisotropic layer of the optical element according to the second embodiment is the same as that of the first embodiment illustrated in FIG. 2.

The optical element 510 according to the fifth embodiment comprises a first optically anisotropic layer 513 which is a cured layer of a liquid crystal composition containing the rod-like liquid crystal compound 40, and a second optically anisotropic layer 514 which is a cured layer of a liquid crystal composition containing the disk-like liquid crystal compound 20. That is, the optical element 510 comprises an optically anisotropic layer 516 having a laminated structure of the first optically anisotropic layer 513 and the second optically anisotropic layer 514.

The optical element 510 according to the present embodiment may also have a configuration in which an optically anisotropic layer is formed on an alignment film which has been formed on a support. Further, the liquid crystal alignment patterns in the planes of the first optically anisotropic layer 513 and the second optically anisotropic layer 514 of the optical element 510 according to the fifth embodiment are the same as the horizontal rotational alignment patterns of the optically anisotropic layers 13 and 14 according to the first embodiment, and the schematic plan views are respectively the same as the plan views illustrating the layers according to the first embodiment in FIGS. 2 and 3.

In the optical element 510, the liquid crystal alignment patterns of the optically anisotropic layers 513 and 514 in the thickness direction are different from those of the optically anisotropic layers 13 and 14 according to the first embodiment. In the optically anisotropic layers 513 and 514, the rod-like liquid crystal compound 40 and the disk-like liquid crystal compound 20 are cholesterically aligned in the thickness direction. The first optically anisotropic layer 513 and the second optically anisotropic layer 514 form one continuous cholesteric alignment in the thickness direction.

The optically anisotropic layer 516 has a function of selectively reflecting only light in a predetermined selected wavelength range of specific circularly polarized light (right circularly polarized light or left circularly polarized light). The center wavelength of light that is selectively reflected is determined by a cholesteric helical pitch and a film thickness $d_6$, and which of the left and right circularly polarized light is reflected is determined by the rotation direction of the helix.

Since the change of the optical axis in the present optical element 510 in the in-plane direction is the same as in the case of the optical element 10 according to the first embodiment illustrated in FIGS. 2 and 3, the same action as in the case of the optical element 10 is generated. Therefore, similar to the optical element 10 according to the first embodiment, the optical element 510 generates an action of changing the absolute phase of the incidence ray and bending the light obliquely. At the same time, since the optically anisotropic layer has a cholesteric phase in the thickness direction, the layer selectively reflects light in a selected wavelength range of a specific circularly polarized light among light incident on the optically anisotropic layer.

Here, the optical element is designed such that the cholesteric phase in the optically anisotropic layer 516 reflects right circularly polarized light having a predetermined center wavelength. Therefore, as illustrated in FIG. 13, in a case where light $L_{51}$ having a predetermined center wavelength, which is right circularly polarized light $P_R$, is perpendicularly incident on one surface of the optically anisotropic layer 516 of the optical element 510, that is, along the normal line, reflected light $L_{52}$ traveling in a direction inclined with respect to the normal direction is generated. That is, the optically anisotropic layer 516 functions as a reflection type diffraction lattice for the light $L_{51}$.

Further, light outside the predetermined selected wavelength range and left circularly polarized light are transmitted through the optically anisotropic layer 516.

Figure 14:
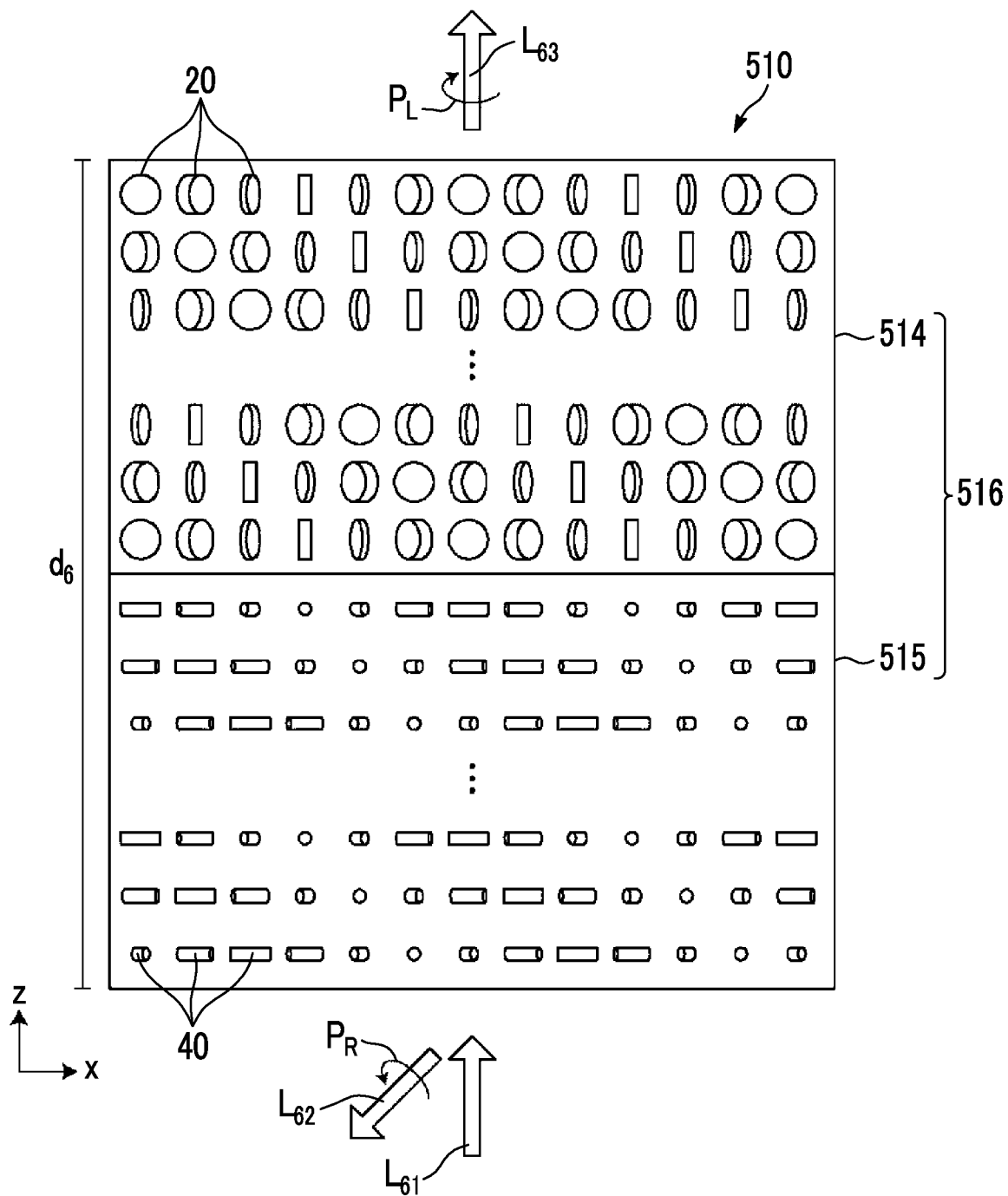
FIG. 14 is a view illustrating reflected light and transmitted light in a case where an incidence ray of randomly polarized light is incident on the optical element according to the fifth embodiment.

Therefore, as illustrated in FIG. 14, in a case where randomly polarized light $L_{61}$ having a predetermined center wavelength is perpendicularly incident on the optically anisotropic layer 516, only right circularly polarized light $L_{62}$ is reflected and diffracted, and left circularly polarized light $L_{63}$ is transmitted through the optically anisotropic layer 516.

Even in the optical element 510 according to the present embodiment, similarly to the optical element 10 according to the first embodiment, the first optically anisotropic layer acts as an approximately negative C plate and the second optically anisotropic layer acts as an approximately positive C plate, and thus the retardation in an oblique direction can be controlled. Therefore, it is possible to provide an optical element capable of transmitting light without influence of birefringence on a wavelength different from the wavelength of diffracted light.

Further, the optical element may comprise a combination of a plurality of optically anisotropic layers having a cholesteric phase in different selected wavelength ranges.

Figure 15:
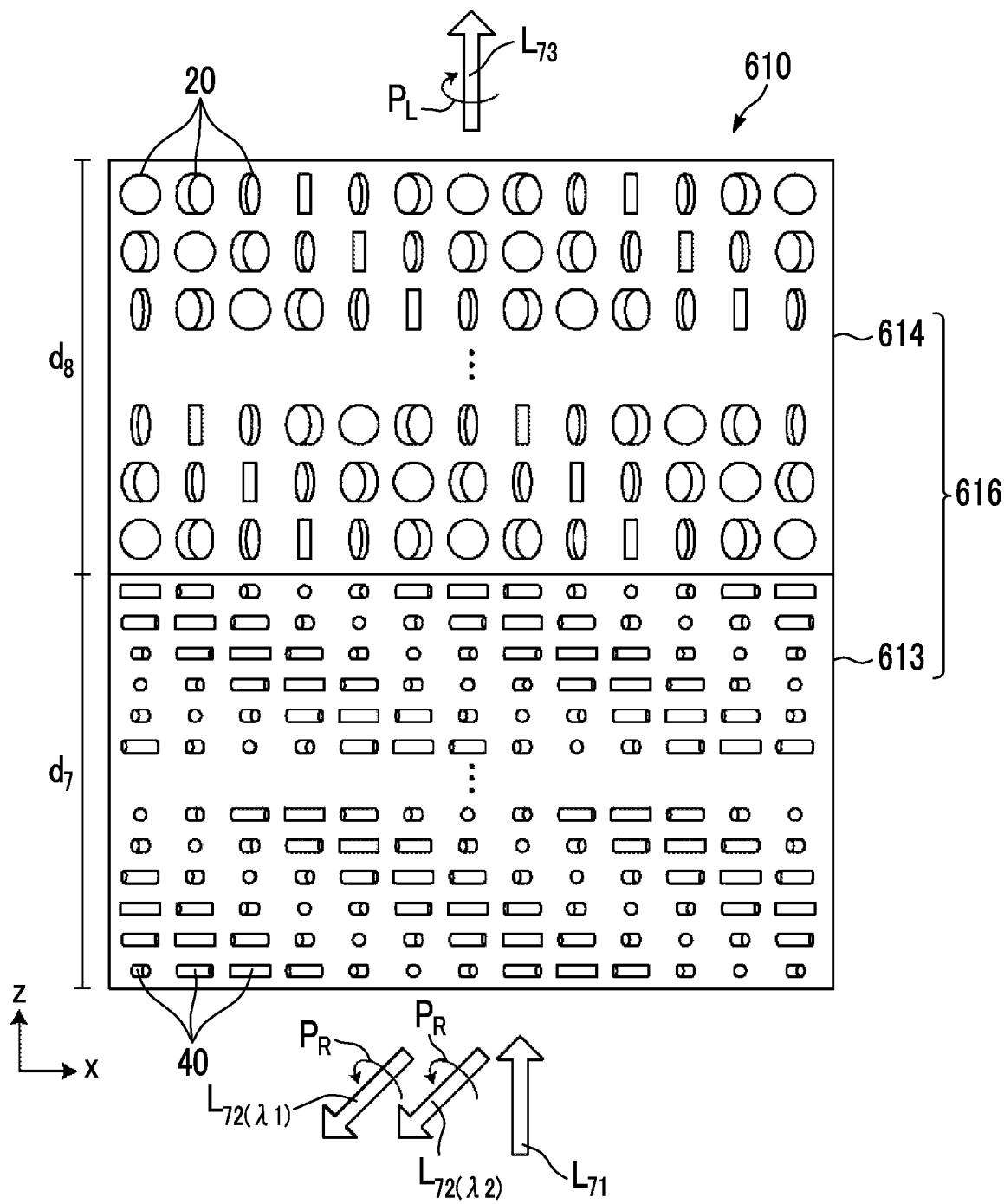
FIG. 15 is a schematic side view illustrating a liquid crystal alignment pattern in an optically anisotropic layer of an optical element according to a sixth embodiment.

FIG. 15 is a schematic side view illustrating a configuration of an optical element 610 according to a sixth embodiment of the present invention.

The optical element 610 according to the sixth embodiment comprises a first optically anisotropic layer 613 which is a cured layer of a liquid crystal composition containing the rod-like liquid crystal compound 40 and a second optically anisotropic layer 614 which is a cured layer of a liquid crystal composition containing the disk-like liquid crystal compound 20. That is, the optical element 610 comprises an optically anisotropic layer 616 having a laminated structure of the first optically anisotropic layer 613 and the second optically anisotropic layer 614.

The liquid crystal alignment patterns in the planes of the first optically anisotropic layer 613 and the second optically anisotropic layer 614 of the optical element 610 according to the sixth embodiment are the same as the horizontal rotational alignment patterns of the optically anisotropic layers 13 and 14 according to the first embodiment, and the schematic plan views are respectively the same as the plan views illustrating the layers according to the first embodiment in FIGS. 2 and 3.

Meanwhile, the rod-like liquid crystal compound 40 exhibits first cholesteric alignment in the thickness direction in the first optically anisotropic layer 613, and the disk-like liquid crystal compound 20 exhibits second cholesteric alignment in the thickness direction in the second optically anisotropic layer 614. That is, the first optically anisotropic layer 613 and the second optically anisotropic layer 614 are independently cholesterically aligned, and the first optically anisotropic layer 613 and the second optically anisotropic layer 614 each independently have a function of selectively reflecting only light in a predetermined selected wavelength range of specific circularly polarized light (right circularly polarized light or left circularly polarized light).

For example, the pitch of the cholesteric alignment and the film thickness $d_7$ are adjusted so that the first optically anisotropic layer 613 reflects light in a first wavelength range (for example, blue light), and the pitch of the cholesteric alignment and the film thickness $d_8$ are adjusted so that the second optically anisotropic layer 614 reflects light in a second wavelength range (for example, green light).

In this manner, for example, in a case where the randomly polarized white light $L_{71}$ is incident on one surface of the optically anisotropic layer 616 of the optical element 610, specific circularly polarized light which is light in the first wavelength range, here, right circularly polarized light $L_{72}$ ($\lambda_1$) and right circularly polarized light $L_{72}$ ($\lambda_2$) which is light in the second wavelength range are reflected as reflected diffracted light. In this case, the left circularly polarized light $L_{73}$ and the right circularly polarized light having a wavelength other than the selected wavelength are transmitted through the optical element 610.

Even in the optical element 610 according to the present embodiment, similarly to in the optical element 10 according to the first embodiment, the first optically anisotropic layer acts as an approximately negative C plate and the second optically anisotropic layer acts as an approximately positive C plate, and thus the retardation in an oblique direction can be controlled. Therefore, it is possible to provide an optical element capable of transmitting light without influence of birefringence on a wavelength different from the wavelength of diffracted light.

According to each of the above-described embodiments, the retardation in an oblique direction may be controlled by laminating both the first optically anisotropic layer which is a cured layer of a liquid crystal composition containing the rod-like liquid crystal compound and the second optically anisotropic layer which is a cured layer of a liquid crystal composition containing the disk-like liquid crystal compound as compared to a case where any one of the optically anisotropic layers is used alone. By suppressing the retardation in an oblique direction in the optical element, a decrease in intensity in a case where light in a wavelength range different from the wavelength range of diffracted light is transmitted through the optical element can be controlled. It is particularly preferable that the retardation in the oblique direction is mutually compensated and completely canceled by laminating both layers.

Hereinafter, the constituent elements of the optical element according to the embodiment of the present invention will be described in detail.

<Optically Anisotropic Layer>

The liquid crystal composition for forming an optically anisotropic layer, which contains a disk-like liquid crystal compound may contain other components such as a leveling agent, an alignment control agent, a polymerization initiator, and an alignment assistant in addition to the disk-like liquid crystal compound. The optically anisotropic layer which is formed of a cured layer of the liquid crystal composition and to which a predetermined liquid crystal alignment pattern is fixed can be obtained by forming an alignment film on the support, coating the alignment film with the liquid crystal composition, and curing the composition.

—Rod-Like Liquid Crystal Compound—

Preferred examples of the rod-like liquid crystal compound include azomethines, azoxys, cyanobiphenyls, cyanophenyl esters, benzoic acid esters, cyclohexanecarboxylic acid phenyl esters, cyanophenyl cyclohexanes, cyano-substituted phenyl pyrimidines, alkoxy-substituted phenyl pyrimidines, phenyldioxane, tolanes, and alkenyl cyclohexyl benzonitriles. Such low-molecular-weight liquid crystal molecules as well as high-molecular-weight liquid crystal molecules can also be used.

It is more preferable that the alignment of the rod-like liquid crystal compound is fixed by polymerization, and compounds described in Makromol. Chem., Vol. 190, p.

2255 (1989), Advanced Materials, Vol. 5, p. 107 (1993), U.S. Pat. Nos. 4,683,327A, 5,622,648A, 5,770,107A, WO95/022586A, WO95/024455A, WO97/000600A, WO98/023580A, WO98/052905A, JP1989-272551A (JP-H01-272551A), JP1994-016616A (JP-H06-016616A), JP1995-110469A (JP-H07-110469A), JP1999-080081A (JP-H11-080081A), and JP2001-328973A can be used as the polymerizable rod-like liquid crystal compounds. Further, compounds described in JP1999-513019A (JP-H11-513019A) and JP2007-279688A can be preferably used as the rod-like liquid crystal compounds.

—Disk-Like Liquid Crystal Compound—

Compounds described in JP2007-108732A and JP2010-244038A can be preferably used as the disk-like liquid crystal compounds.

—Other Components—

Known materials can be used as other components such as an alignment control agent, a polymerization initiator, and an alignment assistant. In addition, a chiral agent is also added in a case of forming the optically anisotropic layer according to the third and fourth embodiments, that is, forming twisted alignment in the thickness direction. In order to form the optically anisotropic layer according to the fifth and sixth embodiments, a chiral agent is added to obtain a cholesteric liquid crystalline phase in the thickness direction.

—Chiral Agent (Optically Active Compound)—

A chiral agent has a function of inducing a helical structure of a cholesteric liquid crystalline phase. The chiral agent may be selected depending on the purpose thereof because the helical twist direction or the helical pitch induced by a compound varies.

The chiral agent is not particularly limited, and known compounds (for example, Liquid Crystal Device Handbook, section 4-3 in Chapter 3, chiral agent for twisted nematic (TN) and super twisted nematic (STN), p. 199, edited by Japan Society for the Promotion of Science, 142th Committee, 1989), isosorbide, and isomannide derivatives can be used.

The chiral agent typically contains asymmetric carbon atoms, but an axially asymmetric compound or planarly asymmetric compound that does not contain asymmetric carbon atoms can also be used as a chiral agent. Examples of the axially asymmetric compound and the planarly asymmetric compound include binaphthyl, helicene, paracyclophane, and derivatives thereof. The chiral agent may contain a polymerizable group. In a case where both the chiral agent and the liquid crystal compound contain a polymerizable group, a polymer having a repeating unit derived from a polymerizable liquid crystal compound and a repeating unit derived from a chiral agent can be formed by the polymerization reaction between the polymerizable chiral agent and the polymerizable liquid crystal compound. In this form, it is preferable that the polymerizable group contained in the polymerizable chiral agent is the same group as the polymerizable group contained in the polymerizable liquid crystal compound. Therefore, as the polymerizable group of the chiral agent, an unsaturated polymerizable group, an epoxy group, or an aziridinyl group is preferable, an unsaturated polymerizable group is more preferable, and an ethylenically unsaturated polymerizable group is still more preferable.

Further, the chiral agent may be a liquid crystal compound.

It is preferable that the chiral agent contains a photoisomerizable group because a pattern of a desired reflection wavelength corresponding to an emission wavelength can be formed by photomask irradiation using actinic rays or the like after application and alignment. As the photoisomerizable group, an isomerizable site of a compound exhibiting photochromic properties, an azo group, an azoxy group, or a cinnamoyl group is preferable. As specific compounds, compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A can be used.

—Solvent—

As a solvent of the liquid crystal composition, an organic solvent is preferably used. Examples of the organic solvent include an amide (such as N,N-dimethylformamide), a sulfoxide (such as dimethyl sulfoxide), a heterocyclic compound (such as pyridine), a hydrocarbon (such as benzene or hexane), an alkyl halide (such as chloroform or dichloromethane), an ester (such as methyl acetate or butyl acetate), a ketone (such as acetone, methyl ethyl ketone, or cyclohexanone), and an ether (such as tetrahydrofuran or 1,2-dimethoxyethane). Among these, an alkyl halide and a ketone are preferable. A combination of two or more kinds of organic solvents may be used.

<Support>

As the support, a transparent support is preferable, and examples thereof include a polyacrylic resin film such as polymethyl methacrylate, a cellulose-based resin film such as cellulose triacetate, and a cycloolefin polymer-based resin [such as "ARTON" (trade name, manufactured by JSR Corporation) or "ZEONOR" (trade name, manufactured by Zeon Corporation)]. The support is not limited to a flexible film, and an inflexible substrate such as a glass substrate may be used.

<Alignment Film for Forming Optically Anisotropic Layer>

Examples of the alignment film for forming an optically anisotropic layer include a rubbed film formed of an organic compound such as a polymer, an obliquely deposited film of an inorganic compound, a film having microgrooves, and a film obtained by accumulating LB films formed of an organic compound such as w-tricosanoic acid, dioctadecylmethylammonium chloride, or methyl stearate according to the Langmuir-Blodgett method. As the alignment film, an alignment film formed by applying a rubbing treatment to a surface of a polymer layer is preferable. The rubbing treatment is performed by rubbing the surface of the polymer layer several times in a certain direction using paper or cloth. As the kind of the polymer used for the alignment film, polyimide, polyvinyl alcohol, polymers containing polymerizable groups described in JP1997-152509A (JP-H09-152509A), and orthogonal alignment films described in JP2005-097377A, JP2005-099228A, and JP2005-128503A can be preferably used. Here, the orthogonal alignment film indicates an alignment film in which a major axis of a molecule in the polymerizable rod-like liquid crystal compound is aligned so as to be substantially orthogonal to the rubbing direction of the orthogonal alignment film. The thickness of the alignment film is not necessarily large as long as the alignment function can be provided, and the thickness thereof is preferably in a range of 0.01 to 5 μm and more preferably in a range of 0.05 to 2 μm.

Further, a so-called photo-alignment film obtained by irradiating a photo-alignment material with polarized light or non-polarized light to obtain an alignment film can also be used. In other words, a photo-alignment film may be prepared by coating the support with a photo-alignment material. The photo-alignment film can be irradiated with polarized light in the vertical direction or oblique direction, and the photo-alignment film can be irradiated with non-polarized light in an oblique direction.

Preferred examples of the photo-alignment material used for the photo-alignment film which can be used in the optical element according to the embodiment of the present disclosure include azo compounds described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B, aromatic ester compounds described in JP2002-229039A, maleimide and/or alkenyl-substituted nadiimide compounds having photo-alignment units described in JP2002-265541A and JP2002-317013A, photo-crosslinking silane derivatives described in JP4205195B and JP4205198B, photo-crosslinked polyimides, polyamides, or esters described in JP2003-520878A, JP2004-529220A, and JP4162850B, and compounds capable of photodimerization, particularly cinnamate compounds, chalcone compounds, and coumarin compounds described in JP1997-118717A (JP-H09-118717A), JP1998-506420A (JP-H10-506420A), JP2003-505561A, WO2010/150748A, JP2013-177561A, JP2014-012823A. Among these, azo compounds, photo-crosslinking polyimides, polyamides, esters, cinnamate compounds, or chalcone compounds are preferable.

In the optical element according to the embodiment of the present disclosure, it is preferable to use a photo-alignment film.

Figure 16:
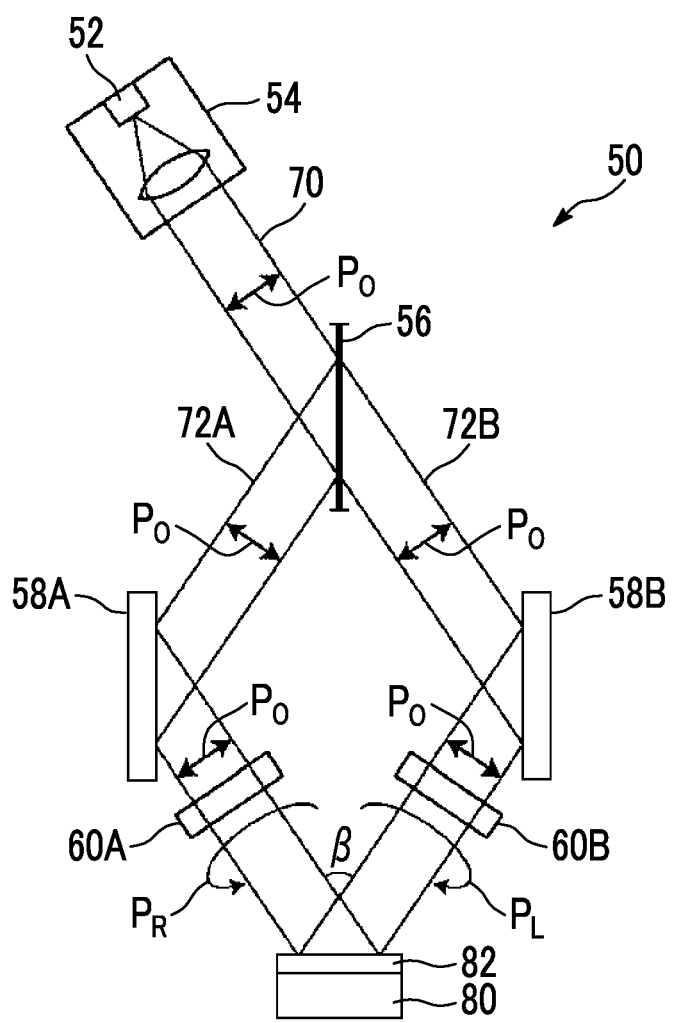
FIG. 16 is a schematic configuration view illustrating an exposure device that irradiates an alignment film with interference light.

The alignment pattern is formed by coating the support with the alignment film, drying the alignment film, and exposing the alignment film to a laser. FIG. 16 is a schematic view illustrating an exposure device for the alignment film. An exposure device 50 comprises a light source 54 comprising a semiconductor laser 52, a beam splitter 56 that separates laser light 70 from the semiconductor laser 52 into two light beams, mirrors 58A and 58B respectively disposed on optical paths of two light beams 72A and 72B, and λ/4 plates 60A and 60B. The λ/4 plates 60A and 60B each comprise an optical axis, and these optical axes are orthogonal to each other. The λ/4 plate 60A converts linearly polarized light PO to right circularly polarized light $P_R$, and the λ/4 plate 60B converts linearly polarized light $P_0$ to left circularly polarized light $P_L$.

A support 80 comprising an alignment film 82 is disposed in an exposed portion, two light beams 72A and 72B are allowed to intersect with each other on the alignment film 82 to interfere with each other, the alignment film 82 is irradiated with interference light so as to be exposed to the light. Due to this interference, the polarization state of light to be applied to the alignment film 82 periodically changes in the form of interference fringes. In this manner, an alignment pattern in which the alignment state periodically changes is obtained. In the exposure device 50, the period of the alignment pattern can be changed by changing an intersecting angle β between two light beams 72A and 72B. An optically anisotropic layer comprising a liquid crystal alignment pattern according to this period can be formed by forming the following optically anisotropic layer on the alignment film having an alignment pattern whose alignment state periodically changes.

<Formation of Optically Anisotropic Layer>

The optically anisotropic layer can be formed by multilayer-coating the alignment film with the liquid crystal composition. The multilayer-coating is performed by coating the alignment film with the liquid crystal composition, heating the composition, cooling the composition, and curing the composition with ultraviolet rays to prepare the liquid crystal fixing layer as the first layer. The second and subsequent liquid crystal fixing layers are obtained by repeating the processes of overcoating the liquid crystal fixing layer with the composition, heating the composition, cooling the composition, and curing the composition using ultraviolet rays. By forming the optically anisotropic layer through multilayer-coating as described above, the alignment direction of the alignment film can be reflected from the lower surface to the upper surface of the optically anisotropic layer even in a case where the total thickness of the optically anisotropic layer increases.

The optically anisotropic layer according to the first embodiment and the optically anisotropic layer according to the second embodiment are different from each other only in terms of the liquid crystal composition, and the same forming method can be employed.

Figure 17:
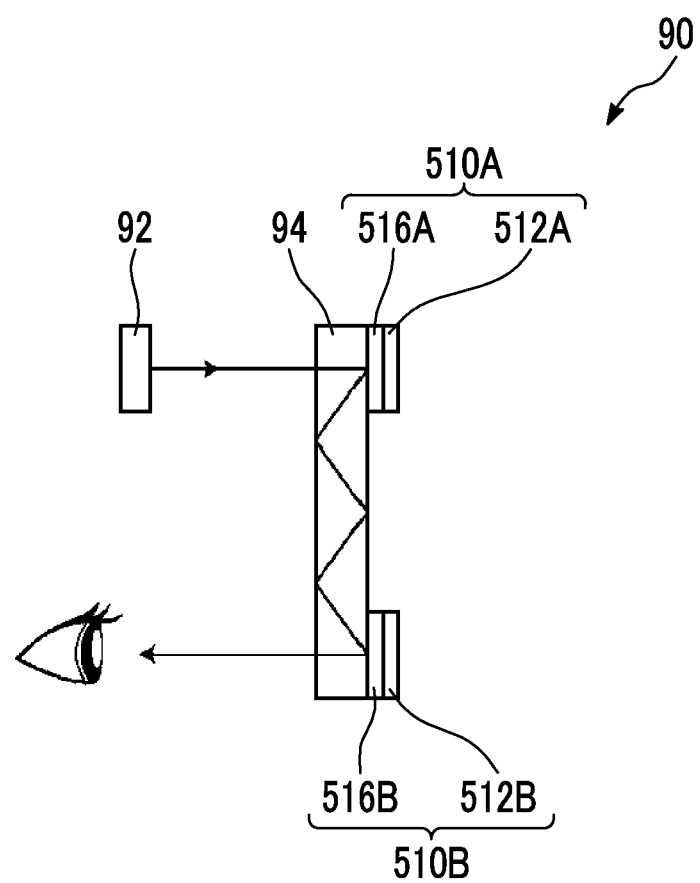
FIG. 17 is a schematic configuration view illustrating a head mounted display which is an example of an optical device.

Next, an example of an optical device comprising the optical element according to the embodiment of the present disclosure will be described. FIG. 17 is a view illustrating the configuration of main portions of a head mounted display 90 which is an example of the optical device.

As illustrated in FIG. 17, the head mounted display 90 comprises a liquid crystal display device 92 which is an embodiment of a light source, and a light guide member 94 which guides light output from the liquid crystal display device 92 and also comprises optical elements 510A and 510B according to the fifth embodiment of the present invention in a portion of the light guide member 94. The liquid crystal display device 92 and the light guide member 94 are disposed such that the light from the liquid crystal display device 92 is perpendicularly incident on the light guide member 94, and the optical element 510A is disposed at a position where the light which has been incident on the light guide member 94 is perpendicularly incident on the surface of the optical element 510A. In addition, the optical element 510B is disposed at a position where the light guided by being totally reflected by the light guide member 94 is incident.

The optical element 510A comprises an optically anisotropic layer 516A and is configured to obliquely reflect specific circularly polarized light having a predetermined center wavelength that is perpendicularly incident on the optically anisotropic layer 516A. The optical element 510B comprises an optically anisotropic layer 516B and is configured to vertically reflect specific circularly polarized light having a predetermined center wavelength that is incident on the optically anisotropic layer 516B in an oblique direction.

As described above, in a case where the optical element according to the embodiment of the present disclosure is used, since the reflection direction of the incidence ray can be set as a desired direction and it is not necessary to separately provide a reflection element and an element for changing an optical path, the size of the optical device can be reduced.

The optical element according to the embodiment of the present disclosure is not limited to the application to the head mounted display 90 as described above, but can also be applied to an AR projection device as a light reflection element that reflects light in a direction different from the incidence angle. Further, as a micromirror or a microlens that condenses or diverges light, the present invention can be applied to a focusing mirror for a sensor or a reflection screen that diffuses light. Further, the optical element according to the embodiment of the present disclosure can be used as a beam steering optical member. In this case, the optical element can be used in combination with a sensor that detects light in a wavelength range different from that of diffracted light through the optical element. Since the optical element according to the embodiment of the present disclosure suppresses influence of the birefringence on light in a wavelength range different from that of diffracted light, light detection can be performed with a smaller detection error than that of an optical element of the related art in a case of using a combination of the optical element and the sensor.

EXAMPLES

Hereinafter, the optical element according to the embodiment of the present invention will be described based on examples and comparative examples.

First, Example 1 and Comparative Example 1 of the optical element according to the first embodiment and Example 2 and Comparative Example 2 of the optical element according to the third embodiment, functioning as a transmission type diffraction lattice, will be described.

Comparative Example 1

An optical element of Comparative Example 1 was prepared by forming an alignment film on a support and forming an optically anisotropic layer A-1 formed of a cured layer of a liquid crystal composition D1 containing a rod-like liquid crystal compound on the alignment film. The optically anisotropic layer A-1 had a liquid crystal alignment pattern in which the rod-like liquid crystal compound rotated and was aligned horizontally.

[Preparation of Optical Element of Comparative Example 1]

A commercially available triacetyl cellulose film "Z-TAC" (manufactured by Fujifilm Corporation) was used as the support.

(Saponification of Support)

The support was allowed to pass through a dielectric heating roll having a temperature of 60° C., and the surface temperature of the support was increased to 40° C. Thereafter, one surface of the support was coated with an alkali solution described below with a coating amount of 14 mL/m² using a bar coater, and the support was heated to 110° C. and transported under a steam type far infrared heater (manufactured by Noritake Co., Ltd.) for 10 seconds. Next, the surface of the support was coated with 3 mL/m² of pure water using the same bar coater. Next, the support was washed with water using a fountain coater and drained using an air knife three times, a drying zone at 70° C. was transported for 10 seconds so that the support was dried, thereby obtaining an alkali-saponified support.

<Alkali Solution>

| | |
|---|---|
| Potassium hydroxide | 4.70 parts by mass |
| Water | 15.80 parts by mass |
| Isopropanol | 63.70 parts by mass |
| Surfactant | |
| SF-1: $C_{14}H_{29}O(CH_2CH_2O)_2OH$ | 1.0 parts by mass |
| Propylene glycol | 14.8 parts by mass |

(Formation of Undercoat Layer)

The alkali-saponified support was continuously coated with the following coating solution for forming an undercoat layer using a #8 wire bar. The support on which the coated film was formed was dried with hot air at 60° C. for 60 seconds and further dried with hot air at 100° C. for 120 seconds, thereby forming an undercoat layer.

<Coating Solution for Forming Undercoat Layer>

| | |
|---|---|
| Modified polyvinyl alcohol shown below | 2.40 parts by mass |
| Isopropyl alcohol | 1.60 parts by mass |
| Methanol | 36.00 parts by mass |
| Water | 60.00 parts by mass |

Modified polyvinyl alcohol

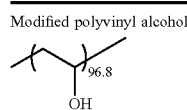

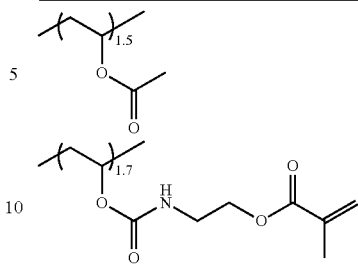

(Formation of Alignment Film P-1)

The support on which the above-described undercoat layer was formed was continuously coated with the following coating solution for forming an alignment film P-1 using a #2 wire bar. The support on which the coated film formed of the coating solution for forming the alignment film P-1 was formed was dried with hot air at 60° C. for 60, thereby forming an alignment film P-1.

<Coating Solution for Forming Alignment Film P-1>

| | |
|---|---|
| Material for photo-alignment shown below | 1.00 parts by mass |
| Water | 16.00 parts by mass |
| Butoxy ethanol | 42.00 parts by mass |
| Propylene glycol monomethyl ether | 42.00 parts by mass |

Material for photo-alignment -

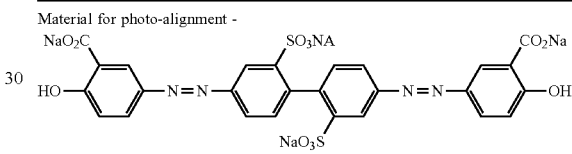

(Exposure of Alignment Film P-1)

The alignment film was exposed using the exposure device 50 illustrated in FIG. 16. An exposure device emitting laser light having a wavelength (405 nm) as semiconductor layer 52 was used as the exposure device 50. The amount of exposure to interference light was set to 100 mJ/cm². Further, the 180° rotation period of a pattern formed by the interference between two laser light beams was controlled by changing an intersecting angle β between two light beams.

(Formation of Optically Anisotropic Layer A-1)

First, the following liquid crystal composition D1 was prepared.

<Liquid Crystal Composition D1>

| | |
|---|---|
| Rod-like liquid crystal compound L-1 | 100.00 parts by mass |
| Polymerization initiator (Irgacure (registered trademark) 907, manufactured by BASF SE) | 3.00 parts by mass |
| Photosensitizer (KAYACURE DETX-S, manufactured by Nippon Kayaku Co., Ltd.) | 1.00 parts by mass |
| Leveling agent T-1 | 0.08 parts by mass |
| Methyl ethyl ketone | 296.50 parts by mass |

Rod-like liquid crystal compound L-1 -

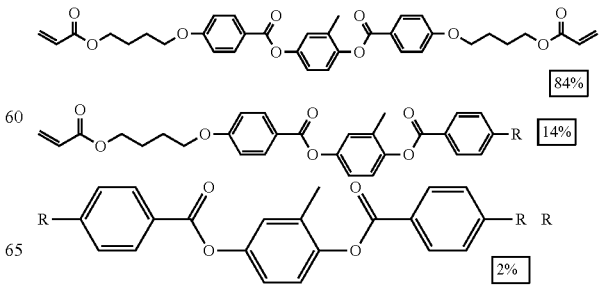

-continued

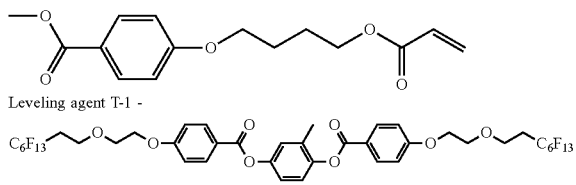

Leveling agent T-1 -

Further, the complex refractive index Δn of the cured layer of the liquid crystal composition D1 was 0.15. The complex refractive index Δn was acquired by measuring the retardation value and the film thickness of the liquid crystal fixing layer (cured layer) obtained by coating a support provided with an alignment film for measuring the retardation which was separately provided with the liquid crystal composition D1, aligning the optical axis of the rod-like liquid crystal compound to be horizontal to the base material, and performing irradiation with ultraviolet rays for fixation. Further, the complex refractive index Δn can be calculated by dividing the retardation value by the film thickness. The retardation value was measured at a wavelength of 550 nm by Axoscan (manufactured by Axometrics, Inc.), and the film thickness was measured using a scanning electron microscope (SEM).

<Application and Formation of Optically Anisotropic Layer A-1>

An optically anisotropic layer A-1 was formed by multilayer-coating the alignment film P-1 with the following liquid crystal composition D1. The multilayer-coating was performed by coating the alignment film with the first liquid crystal composition D1, heating the composition, cooling the composition, and curing the composition with ultraviolet rays to prepare the liquid crystal fixing layer. The second and subsequent liquid crystal fixing layers were obtained by repeating the processes of coating the liquid crystal fixing layer with the composition through overcoating, heating the composition, cooling the composition, and curing the composition using ultraviolet rays. By forming the optically anisotropic layer through multilayer-coating, the alignment direction of the alignment film can be reflected from the lower surface to the upper surface of the liquid crystal layer even in a case where the total thickness of the liquid crystal layer increases.

First, as the first layer, the coated film obtained by coating the alignment film P-1 with the following liquid crystal composition D1 was heated on a hot plate at 110° C. and then cooled to 60° C., and the coated film was irradiated with ultraviolet rays having a wavelength of 365 nm at an irradiation dose of 100 mJ/cm² using a high pressure mercury lamp in a nitrogen atmosphere, thereby fixing the alignment of the liquid crystal compound. At this time, the film thickness of the fixed liquid crystal layer (one liquid crystal fixing layer) was 0.2 μm.

The second and subsequent liquid crystal fixing layers were formed by coating the previously formed liquid crystal fixing layer with the liquid crystal composition D1 through overcoating, heating and cooling the composition under the same conditions as described above, and then curing the composition using ultraviolet rays. In this manner, an optically anisotropic layer A-1 was obtained by repeating the overcoating until the total thickness reached a desired film thickness. Finally, it was confirmed that the birefringence of the liquid crystal was 275 nm (=λ/2) and the surface was periodically aligned using a polarizing microscope.

Comparative Example 2

In contrast to Comparative Example 1, an optical element comprising an optically anisotropic layer A-2 formed of a cured layer of a liquid crystal composition E1 containing a disk-like liquid crystal compound in place of the rod-like liquid crystal compound was obtained. That is, the optical element of Comparative Example 2 had a liquid crystal alignment pattern in which the disk-like liquid crystal compound rotated and was aligned horizontally.

(Formation of Optically Anisotropic Layer A-2)

A liquid crystal composition E1 with the following composition was prepared.

<Liquid Crystal Composition E1>

| | |
|---|---|
| Disk-like liquid crystal compound L-2 | 80.00 parts by mass |
| Disk-like liquid crystal compound L-3 | 20.00 parts by mass |
| Polymerization initiator (Irgacure (registered trademark) 907, manufactured by BASF SE): | 5.00 parts by mass |
| MEGAFACE F444 (manufactured by DIC Corporation) | 0.50 parts by mass |
| Methyl ethyl ketone | 300.00 parts by mass |

Disk-like liquid crystal compound L-2

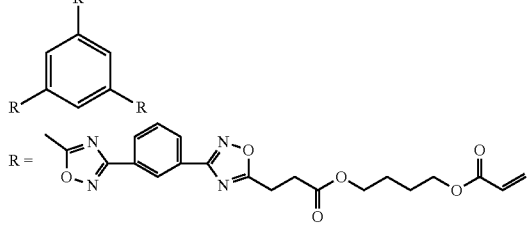

Disk-like liquid crystal compound L-3

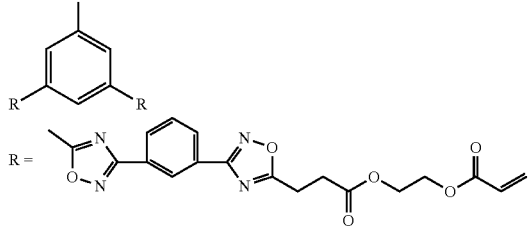

The complex refractive index Δn of the cured layer of the liquid crystal composition E1 was 0.15. The complex refractive index Δn was acquired according to the same method as in the case of the liquid crystal composition D1.

<Application and Formation of Optically Anisotropic Layer A-2>

First, as the first layer, the coated film obtained by coating the alignment film P-1 with the above-described liquid crystal composition E1 was heated on a hot plate at 110° C. and then cooled to 60° C., and the coated film was irradiated with ultraviolet rays having a wavelength of 365 nm at an irradiation dose of 100 mJ/cm² using a high pressure mercury lamp in a nitrogen atmosphere, thereby fixing the alignment of the liquid crystal compound. At this time, the film thickness of the fixed liquid crystal layer (one liquid crystal fixing layer) was 0.2 μm.

The second and subsequent liquid crystal fixing layers were formed by coating the previously formed liquid crystal fixing layer with the liquid crystal composition E1 through overcoating, heating and cooling the composition under the same conditions as described above, and then curing the composition using ultraviolet rays. In this manner, an optically anisotropic layer A-2 was obtained by repeating the overcoating until the total thickness reached a desired film thickness. Finally, it was confirmed that the birefringence of the liquid crystal was 275 nm (=λ/2) and the surface was periodically aligned using a polarizing microscope.

Example 1

First, an alignment film was formed on a support, and an optically anisotropic layer A-1 (hereinafter, referred to as a first optically anisotropic layer A-1) formed of a cured layer of a liquid crystal composition D1 containing a rod-like liquid crystal compound was formed on the alignment film. Thereafter, an optically anisotropic layer A-2 (hereinafter, referred to as a second optically anisotropic layer A-2) formed of a cured layer of a liquid phase composition E1 containing the disk-like liquid crystal compound was formed, thereby preparing an optical element of Example 1.

That is, the optical element had a two-layer structure of the first optically anisotropic layer A-1 formed of a cured layer of a liquid crystal composition D1 containing a rod-like liquid crystal compound as the first layer and the second optically anisotropic layer A-2 formed of a cured layer of a liquid crystal composition E1 containing a disk-like liquid crystal compound as the second layer.

The optical element of Example 1 was obtained by forming the alignment film on the support and forming the first optically anisotropic layer A-1 on the alignment film in the same manner as in Comparative Example 1 and then forming the optically anisotropic layer A-2 on the optically anisotropic layer A-1 in the same manner as that for the optically anisotropic layer A-2 formed on the alignment film in Comparative Example 2. In this case, each of the optically anisotropic layers A-1 and A-2 was prepared in the same manner as in Comparative Examples 1 and 2 except that the coating amount was adjusted such that the in-plane retardation $\Delta nd$ ($=\Delta n_1 d_1 + \Delta n_2 d_2$) of the entire laminated structure was set to 275 nm. Here, $\Delta n_1$ represents the birefringence of the first optically anisotropic layer, $d_1$ represents the thickness of the first optically anisotropic layer, $\Delta n_2$ represents the birefringence of the second optically anisotropic layer, and $d_2$ represents the thickness of the second optically anisotropic layer.

In addition, both $\Delta n_1$ and $\Delta n_2$ were 0.15. The complex refractive index $\Delta n$ was acquired according to the same method as in the case of the liquid crystal composition D1.

It was confirmed that two layers of the liquid crystal alignment patterns having horizontal rotational alignment were laminated on each other based on the cross section SEM image of the optical element of Example 1. Further, it was confirmed that the first optically anisotropic layer which was the first layer had alignment of rod-like liquid crystal compound, and the second optically anisotropic layer which was the second layer had alignment of the disk-like liquid crystal compound, as measured by Axoscan (manufactured by Axometrics, Inc.). The prepared optical element has a structure in which two layers were laminated, and the in-plane retardation $\Delta n_1 d_1$ of the first optically anisotropic layer was 138 nm, the twist angle thereof was 0°, the in-plane retardation $\Delta n_2 d_2$ of the second optically anisotropic layer was 137 nm, and the twist angle thereof was 0°.

Example 2

Similar to Example 1, an optical element having a two-layer structure of a first optically anisotropic layer and a second optically anisotropic layer was prepared. Similar to the order of lamination in Example 1, a structure in which a support and an alignment film were laminated in this order, a first optically anisotropic layer was laminated thereon, and a second optically anisotropic layer was laminated thereon was formed. The optical element had a two-layer structure of the first optically anisotropic layer formed of a cured layer of a liquid crystal composition D21 containing a rod-like liquid crystal compound as the first layer and the second optically anisotropic layer formed of a cured layer of a liquid crystal composition E21 containing a disk-like liquid crystal compound as the second layer. The first optically anisotropic layer and the second optically anisotropic layer were designed to have liquid crystal alignment patterns having twist properties exhibiting opposite orientation in the thickness direction.

In the liquid crystal composition D21, a chiral agent Ch-2 was added to the liquid crystal composition D1 used in Example 1. In the liquid crystal composition E21, a chiral agent Ch-3 was added to the liquid crystal composition E1 used in Example 1. The chiral agents Ch-2 and Ch-3 impart twist properties exhibiting opposite orientation in the thickness direction.

The optical element of Example 2 was prepared in the same manner as in Example 1 except that the coating amount was adjusted such that the in-plane retardations $\Delta n_1 d_1$ and $\Delta n_2 d_2$ of the first optically anisotropic layer and the second optically anisotropic layer were respectively set to 275 nm.

<Liquid Crystal Composition D21>

| | |
|---|---|
| Rod-like liquid crystal compound L-1 | 100.00 parts by mass |
| Polymerization initiator (Irgacure (registered trademark) 907, manufactured by BASF SE) | 3.00 parts by mass |
| Photosensitizer (KAYACURE DETX-S, manufactured by Nippon Kayaku Co., Ltd.) | 1.00 parts by mass |
| Leveling agent T-1 | 0.08 parts by mass |
| Chiral agent Ch-2 | 0.12 parts by mass |
| Methyl ethyl ketone | 296.50 parts by mass |

Chiral agent Ch-2 -

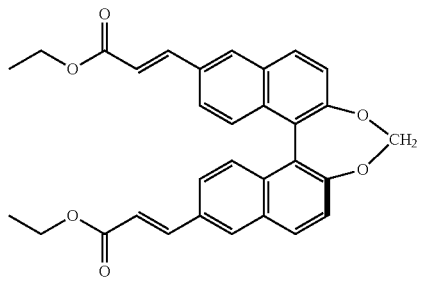

| | |
|---|---|
| Disk-like liquid crystal compound L-2 | 80.00 parts by mass |
| Disk-like liquid crystal compound L-3 | 20.00 parts by mass |
| Polymerization initiator (Irgacure (registered trademark) 907, manufactured by BASF SE) | 5.00 parts by mass |
| MEGAFACE F444 (manufactured by DIC Corporation) | 0.50 parts by mass |
| Chiral agent Ch-3 | 0.14 parts by mass |
| Methyl ethyl ketone | 300.00 parts by mass |

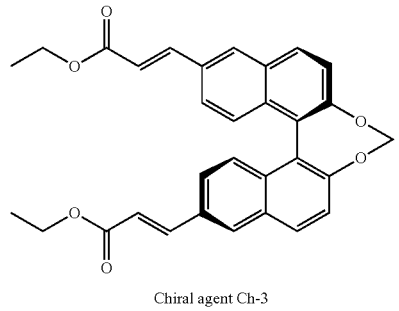

Chiral agent Ch-3

It was confirmed that two layers of the liquid crystal alignment patterns having a horizontal rotational alignment and twist properties exhibiting opposite orientation in the thickness direction were laminated on each other based on the cross section SEM image of the optical element of Example 2. Further, it was confirmed that the first optically anisotropic layer which was the first layer had alignment of rod-like liquid crystal compound, and the second optically anisotropic layer which was the second layer had alignment of the disk-like liquid crystal compound, as measured by Axoscan (manufactured by Axometrics, Inc.). In the optical element of Example 2, the in-plane retardation $\Delta n_1 d_1$ of the first optically anisotropic layer was 275 nm, the twist angle thereof was 75°, the in-plane retardation $\Delta n_2 d_2$ of the second optically anisotropic layer was 275 nm, and the twist angle thereof was −75°.

[Evaluation]
—Measurement of Diffraction Angle—

For each of the optical elements of Examples 1 and 2 and Comparative Examples 1 and 2, light was perpendicularly incident on the surface of the optically anisotropic layer through the support of the optical element, and the diffraction angle of the transmitted diffracted light was measured. Specifically, the diffraction angle was calculated by allowing laser light as right circularly polarized light having an output center wavelength of 550 nm to be perpendicularly incident on one surface of the optical element from a position separated by 50 cm in the normal direction and capturing the spot of the transmitted diffracted light using a screen disposed at a distance of 50 cm from the other surface of the optical element.

—Measurement of Light Intensity—

Figure 18:
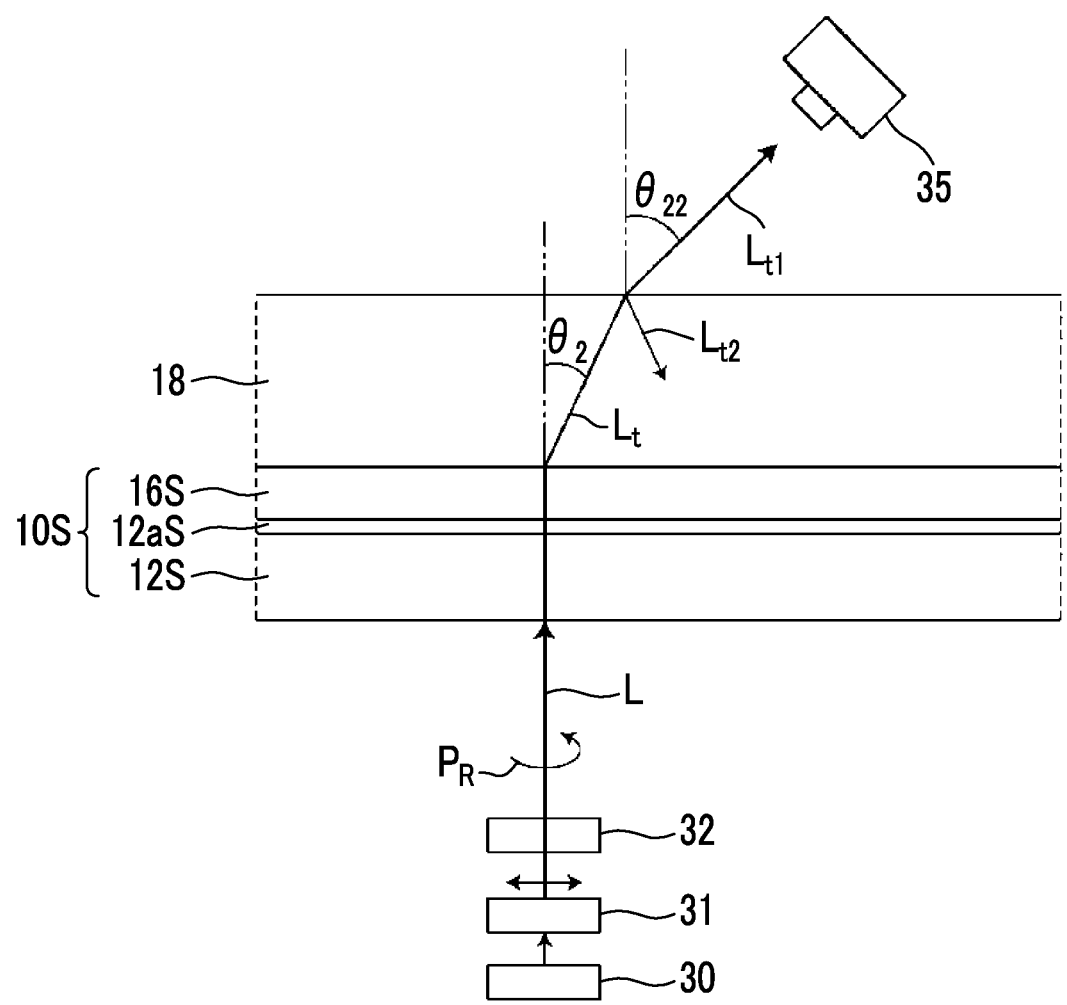
FIG. 18 is a view for explaining a method of measuring the light intensity of a transmission type optical element.

A method of measuring the light intensity will be described with reference to FIG. 18. An optical element 10S of each example and each comparative example comprises an optically anisotropic layer 16S having a single-layer or two-layer structure on an alignment film 12aS comprised on the surface of a support 12S. A second support 18 having a refractive index substantially the same as that of the support 12S was adhered to one surface of the optically anisotropic layer 16S opposite to the surface of the alignment film 12aS side where one surface of the optically anisotropic layer 16S was provided to obtain a sample for measurement.

Semiconductor laser light having a wavelength of 550 nm emitted from the semiconductor laser 30 was transmitted through a linear polarizer 31 and a λ/4 plate 32 to obtain light L of right circularly polarized light $P_R$. By allowing the light L to be perpendicularly incident on the support 12, the light L was perpendicularly incident on one surface of the optically anisotropic layer 14. In this case, the diffracted light $L_t$ having a diffraction angle $\theta_2$ was output from the other surface of the optically anisotropic layer 14 by the diffraction action of the optically anisotropic layer 14. The diffracted light $L_t$ traveled through the second support 18 connected to the other surface of the optically anisotropic layer 14 and was emitted from the surface of the sample to the atmosphere. The light intensity of the emitted light $L_{t1}$ was measured by a photodetector 35. The diffracted light $L_t$ was bent due to a difference in refractive index at the interface between the sample and the atmosphere so that emitted light $L_{t1}$ emitted at an emission angle $\theta_{22}$ and reflected light $L_{t2}$ reflected inside the second support 18 were generated. The light intensity detected by the photodetector 35 and the light intensity of the light $L_{t2}$ internally reflected according to the Fresnel rule were acquired, and the light intensity of the diffracted light $L_t$ was calculated.

Further, the relative light intensity value of the diffracted light $L_t$ with respect to the incidence ray was acquired by calculating the ratio between the light intensity of the diffracted light $L_t$ and the light intensity of the light L.

The relative light intensity values acquired in the above-described manner were evaluated based on the following standards.

A: The improvement rate with respect to Comparative Example 1 was 15% or greater.

B: The improvement rate with respect to Comparative Example 1 was 2% or greater and less than 15%.

C: The improvement rate with respect to Comparative Example 1 is less than 2%.

—Measurement of Transmittance of Light Having Wavelength Other than Wavelength of Diffracted Light—

The transmittance was measured by the following method in order to evaluate the influence of the liquid crystal diffraction element on a wavelength other than the wavelength of diffracted light. The optical element was interposed between polarizing plates arranged in parallel, and the transmittance of infrared light (having a wavelength of 940 nm) at a polar angle of 60° was measured at an angle of 45° from the direction of the polarizing axis. Infrared light having a wavelength of 940 nm was used as an example of light having a wavelength other than the wavelength of diffracted light. It is desirable that the influence of oblique retardation due to the optical element decreased as the transmittance of the infrared light increased.

The transmittance of light having a wavelength other than the wavelength of diffracted light which was acquired in the above-described manner was evaluated based on the following standards.

A: The improvement rate with respect to Comparative Example 1 was 20% or greater B: The improvement rate with respect to Comparative Example 1 was 10% or greater and less than 20%

C: The improvement rate with respect to Comparative Example 1 was 5% or greater and less than 10%

D: The improvement rate with respect to Comparative Example 1 was less than 5%

The configurations and the evaluation results of the optical elements of Examples 1 to 3 and Comparative Examples 1 to 3 are listed in Table 1.

TABLE 1

| Transmission type optical element | | | Comparative Example 1 | Comparative Example 2 | Example 1 | Example 2 |
|---|---|---|---|---|---|---|
| Configuration | First optically anisotropic layer | Type of liquid crystal | Rod-like D1 | Disk-like E1 | Rod-like | Rod-like |
| | | Form of alignment | Horizontal rotational alignment | Horizontal rotational alignment | Horizontal rotational alignment | Horizontal rotational alignment + twisted alignment |
| | | Δn | 0.15 | 0.15 | 0.15 | 0.15 |
| | | Film thickness (μm) | 1.83 | 1.83 | 0.92 | 1.83 |
| | | Retardation (nm) | 275 | 275 | 138 | 275 |
| | | Rotation period p (μm) | 1 | 1 | 1 | 1 |
| | Second optically anisotropic layer | Type of liquid crystal | — | — | Disk-like | Disk-like |
| | | Form of alignment | — | — | Horizontal rotational alignment | Horizontal rotational alignment + opposite twisted alignment |
| | | Δn | — | — | 0.15 | 0.15 |
| | | Film thickness (μm) | — | — | 0.91 | 1.83 |
| | | Retardation (nm) | — | — | 137 | 275 |
| | | Rotation period p (μm) | — | — | 1 | 1 |
| Evaluation | Diffraction angle (°) | | 33 | 33 | 33 | 33 |
| | Intensity of diffracted light | | Standard | B | C | A |
| | Transmittance of light having wavelength other than wavelength of diffracted light | | Standard | D | A | A |

As listed in Table 1, it was confirmed that in each example in which the optical element had a laminated structure of the first optically anisotropic layer containing a rod-like liquid crystal compound and the second optically anisotropic layer containing a disk-like liquid crystal compound, the transmittance of light having a wavelength other than the wavelength of diffracted light was high while the diffracted light intensity was maintained as compared to each comparative example in which the optical element had only the optically anisotropic layer containing a disk-like liquid crystal compound or only the optically anisotropic layer containing a rod-like liquid crystal compound.

Next, the optical element according to the third embodiment, functioning as a reflection type diffraction lattice, in Example 11 and Comparative Examples 11 and 12 will be described.

Comparative Example 11

An optical element of Comparative Example 11 was prepared by forming an alignment film on a support and forming an optically anisotropic layer A-3 formed of a cured layer of a liquid crystal composition D2 containing a rod-like liquid crystal compound on the alignment film. The optically anisotropic layer had a liquid crystal alignment pattern in which a disk-like liquid crystal compound rotated and was aligned horizontally and which had a cholesteric phase in the thickness direction.

[Preparation of Optical Element of Comparative Example 11]

An optical element of Example 11 was prepared in the same manner as in Comparative Example 1 except that an optically anisotropic layer having a liquid crystal alignment pattern with a cholesteric phase was formed using the liquid crystal composition D1 as the liquid crystal composition D2. It was confirmed that the liquid crystal alignment pattern had a cholesteric phase based on the cross section SEM image of the optical element and also confirmed that the liquid crystal alignment pattern was a pattern in which a disk-like liquid crystal compound was aligned by performing measurement using Axoscan (manufactured by Axometrics, Inc.).

<Liquid Crystal Composition D2>

| | |
|---|---|
| Rod-like liquid crystal compound L-1 | 100.00 parts by mass |
| Polymerization initiator (Irgacure (registered trademark) 907, manufactured by BASF SE) | 3.00 parts by mass |
| Photosensitizer (KAYACURE DETX-S, manufactured by Nippon Kayaku Co., Ltd.) | 1.00 parts by mass |

| | |
|---|---|
| Chiral agent Ch-1 | 5.45 parts by mass |
| Leveling agent T-1 | 0.08 parts by mass |
| Methyl ethyl ketone | 268.20 parts by mass |

Chiral agent Ch-1 -

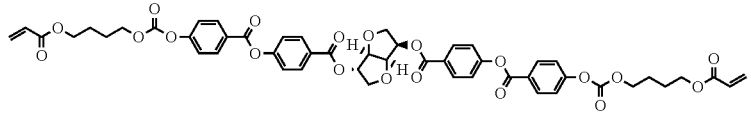 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

(Formation of Optically Anisotropic Layer A-3)

The optically anisotropic layer A-3 was formed by multilayer-coating the alignment film P-1 with the liquid crystal composition D2.

First, as the first layer, the coated film obtained by coating the alignment film P-1 with the following liquid crystal composition D2 was heated on a hot plate at 95° C. and then cooled to 25° C., and the coated film was irradiated with ultraviolet rays having a wavelength of 365 nm at an irradiation dose of 100 mJ/cm² using a high pressure mercury lamp in a nitrogen atmosphere, thereby fixing the alignment of the liquid crystal compound. At this time, the film thickness of the fixed liquid crystal layer (one liquid crystal fixing layer) was 0.2 μm.

The second and subsequent liquid crystal fixing layers were formed by coating the previously formed liquid crystal fixing layer with the liquid crystal composition D2 through overcoating, heating and cooling the composition under the same conditions as described above, and then curing the composition using ultraviolet rays. In this manner, the optically anisotropic layer A-3 was obtained by repeating the overcoating until the total thickness reached a desired film thickness (here, 4.5 μm). Further, it was confirmed that the surface was periodically aligned using a polarizing microscope and an SEM.

Comparative Example 12

In contrast to Comparative Example 11, an optical element comprising an optically anisotropic layer A-4 formed of a cured layer of a liquid crystal composition E2 containing a disk-like liquid crystal compound in place of the rod-like liquid crystal compound was obtained. That is, in the optical element of Comparative Example 12, the optically anisotropic layer had a liquid crystal alignment pattern in which the disk-like liquid crystal compound rotated and was aligned horizontally and which had a cholesteric phase in the thickness direction.

[Preparation of Optical Element of Comparative Example 12]

An optical element of Comparative Example 12 was prepared in the same manner as in Example 1 except that an optically anisotropic layer A-4 was formed using the liquid crystal composition D2 as the liquid crystal composition E2.

(Formation of Optically Anisotropic Layer A-4)

A liquid crystal composition E2 with the following composition was prepared.

<Liquid Crystal Composition E2>

| | |
|---|---|
| Disk-like liquid crystal compound L-2 | 80.00 parts by mass |
| Disk-like liquid crystal compound L-3 | 20.00 parts by mass |
| Polymerization initiator (Irgacure (registered trademark) 907, manufactured by BASF SE) | 5.00 parts by mass |

-continued

| | |
|---|---|
| Chiral agent Ch-2 | 3.79 parts by mass |
| MEGAFACE F444 (manufactured by DIC Corporation) | 0.50 parts by mass |
| Methyl ethyl ketone | 255.00 parts by mass |

<Application and Formation of Optically Anisotropic Layer A-4>

An optically anisotropic layer was formed by multilayer-coating the alignment film P-1 with the liquid crystal composition E2 in place of the liquid crystal composition D2 in Comparative Example 11.

First, as the first layer, the coated film obtained by coating the alignment film P-1 with the following liquid crystal composition E2 was heated on a hot plate at 95° C. and then cooled to 25° C., and the coated film was irradiated with ultraviolet rays having a wavelength of 365 nm at an irradiation dose of 100 mJ/cm² using a high pressure mercury lamp in a nitrogen atmosphere, thereby fixing the alignment of the liquid crystal compound. At this time, the film thickness of the fixed liquid crystal layer (one liquid crystal fixing layer) was 0.2 μm.

The second and subsequent liquid crystal fixing layers were formed by coating the previously formed liquid crystal fixing layer with the liquid crystal composition E2 through overcoating, heating and cooling the composition under the same conditions as described above, and then curing the composition using ultraviolet rays. In this manner, an optically anisotropic layer A-4 was obtained by repeatedly performing the overcoating until the total thickness reached a desired film thickness (here, 4.5 μm). Further, it was confirmed that the surface was periodically aligned using a polarizing microscope and an SEM.

Example 11

An alignment film was formed on a support, and an optically anisotropic layer A-3 (hereinafter, referred to as a first optically anisotropic layer A-3) formed of a cured layer of a liquid crystal composition D2 containing a rod-like liquid crystal compound was formed on the alignment film. Thereafter, an optically anisotropic layer A-4 (hereinafter, referred to as a second optically anisotropic layer A-4) formed of a cured layer of a liquid phase composition E2 containing a disk-like liquid crystal compound was formed, thereby preparing an optical element of Example 11.

That is, the optical element had a two-layer structure of the first optically anisotropic layer A-3 formed of a cured layer of a liquid crystal composition containing a rod-like liquid crystal compound as the first layer and the second optically anisotropic layer A-4 formed of a cured layer of a liquid crystal composition containing a disk-like liquid crystal compound as the second layer.

The optical element of Example 11 was obtained by forming the alignment film on the support and forming the optically anisotropic layer A-3 on the alignment film in the same manner as in Comparative Example 11 and then forming the optically anisotropic layer A-4 on the optically anisotropic layer A-3 in the same manner as that for the optically anisotropic layer A-4 formed on the alignment film in Comparative Example 12. In this case, the optical element of Example 11 was prepared in the same manner as in Comparative Examples 11 and 12 except that the coating amount was adjusted such that the film thicknesses of the optically anisotropic layers A-3 and A-4 were respectively set to 2.25 µm and the film thickness of the two layers was set to 4.5 µm, and thus the total film thickness was the same as the film thickness of the optically anisotropic layer of Comparative Example 12. In the optical element of Example 11, one continuous cholesteric alignment was formed two layers of the first optically anisotropic layer A-3 and the second optically anisotropic layer A-4 in the thickness direction. The cholesteric alignment was designed such that the selective reflection center wavelength was set to 550 nm. Further, it was confirmed that the surface was periodically aligned using a polarizing microscope and an SEM.

[Evaluation]

—Measurement of Diffraction Angle—

For each of the optical elements of Example 11 and Comparative Examples 11 and 12, light was perpendicularly incident on the surface of the optically anisotropic layer through the support of the optical element, and the diffraction angle of the reflected diffracted light was measured. Specifically, the diffraction angle was calculated by allowing laser light as right circularly polarized light having an output center wavelength of 550 nm to be perpendicularly incident on one surface of the optical element, that is, one surface of the optically anisotropic layer from the position separated by 50 cm in the normal direction and capturing the spot of the reflected diffracted light using a screen disposed at a distance of 50 cm from one surface of the optical element.

—Measurement of Light Intensity—

Figure 19:
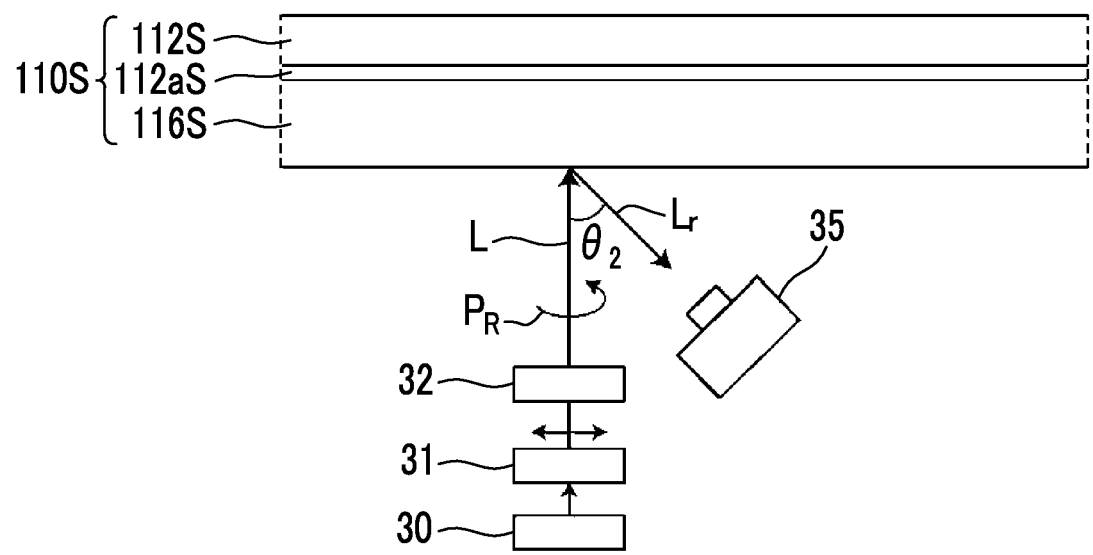
FIG. 19 is a view for explaining a method of measuring the light intensity of a reflection type optical element.
Figure 20:
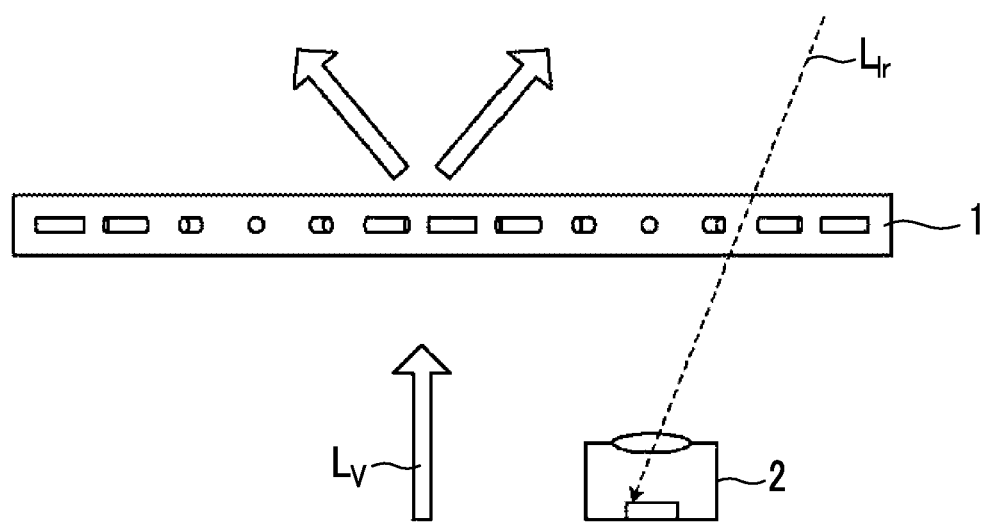
FIG. 20 is a view for explaining a problem of a liquid crystal diffraction lattice of the related art.

A method of measuring the light intensity will be described with reference to FIG. 19. The optical element 110S of each example and each comparative example comprises an optically anisotropic layer 116S having a single-layer or two-layer structure on an alignment film 112aS comprised on the surface of a support 112S.

Semiconductor laser light having a wavelength of 550 nm emitted from the semiconductor laser 30 was transmitted through a linear polarizer 31 and a λ/4 plate 32 to obtain light L of right circularly polarized light $P_R$. This light L was perpendicularly incident on the surface of the optically anisotropic layer 116S. In this case, the light intensity of the diffracted light Lr reflected and diffracted at a diffraction angle $\theta_2$ due to the diffraction action and the selective reflection action of the optically anisotropic layer 116S was measured by the photodetector 35. Further, the relative light intensity value of the diffracted light Lr with respect to the incidence ray L was acquired by calculating the ratio between the light intensity of the diffracted light Lr and the light intensity of the incidence ray L.

The relative light intensity values acquired in the above-described manner were evaluated based on the following standards.

A: The improvement rate with respect to Comparative Example 11 was 15% or greater B: The improvement rate with respect to Comparative Example 11 was 2% or greater and less than 15%

C: The improvement rate with respect to Comparative Example 11 was less than 2%

—Measurement of Transmittance of Light Having Wavelength Other than Wavelength of Diffracted Light—

The transmittance of light having a wavelength other than the wavelength of diffracted light was measured according to the same method as in Example 1. However, the evaluation was performed based on Comparative Example 11 in place of Comparative Example 1.

The configurations and the evaluation results of the optical elements of Example 11 and Comparative Examples 11 and 12 are collectively listed in Table 2.

TABLE 2

| Reflection type optical element | | | Comparative Example 11 | Comparative Example 12 | Example 11 |
|---|---|---|---|---|---|
| Configuration | First optically anisotropic layer | Type of liquid crystal | Rod-like | Disk-like | Rod-like |
| | | Form of alignment | Horizontal rotational alignment + cholesteric alignment | Horizontal rotational alignment + cholesteric alignment | Horizontal rotational alignment + cholesteric alignment |
| | | Δn | 0.15 | 0.15 | 0.15 |
| | | Film thickness (µm) | 4.50 | 4.50 | 2.25 |
| | | Cholesteric pitch (nm) | 0.35 | 0.35 | 0.35 |
| | | Rotation period p (µm) | 1 | 1 | 1 |
| | Second optically anisotropic layer | Type of liquid crystal | — | — | Disk-like |
| | | Form of alignment | — | — | Horizontal rotational alignment + cholesteric alignment |
| | | Δn | — | — | 0.15 |
| | | Film thickness (µm) | — | — | 2.25 |
| | | Cholesteric pitch (nm) | — | — | 0.35 |
| | | Rotation period p (µm) | — | — | 1 |
| Evaluation | | Diffraction angle (°) | 33 | 33 | 33 |
| | | Intensity of diffracted light | Standard | B | B |
| | | Transmittance of light having wavelength other than wavelength of diffracted light | Standard | D | A |

As listed in Table 2, it was confirmed that in the example in which the reflection type optical element had a laminated structure of the first optically anisotropic layer containing a rod-like liquid crystal compound and the second optically anisotropic layer containing a disk-like liquid crystal compound, the transmittance of light having a wavelength other than the wavelength of diffracted light was high while the diffracted light intensity was maintained as compared to each comparative example in which the optical element had only the optically anisotropic layer containing a disk-like liquid crystal compound or only the optically anisotropic layer containing a rod-like liquid crystal compound.

The disclosure of JP2018-096569 filed on May 18, 2018 is incorporated herein by reference in its entirety.

In a case where all documents, patent applications, and technical standards described in the present specification are specified to be incorporated specifically and individually as cited documents, the documents, patent applications, and technical standards are incorporated herein in the same limited scope as the cited documents.

What is claimed is:

1. An optical element comprising:
an optically anisotropic layer having a laminated structure in which a first optically anisotropic layer, which is a cured layer of a liquid crystal composition containing a rod-like liquid crystal compound, and a second optically anisotropic layer, which is laminated on the first optically anisotropic layer and is a cured layer of a liquid crystal composition containing a disk-like liquid crystal compound, are laminated on each other,
wherein the first optically anisotropic layer has a first liquid crystal alignment pattern in which an optical axis of the rod-like liquid crystal compound is parallel to a surface of the first optically anisotropic layer and is oriented along at least one in-plane direction of the first optically anisotropic layer, orientation of the optical axis of the rod-like liquid crystal compound changes continuously and rotationally along the at least one in-plane direction of the first optically anisotropic layer, and the orientation of the optical axis of the rod-like liquid crystal compound rotates by 180° with a period of 0.5 μm to 5 μm, and
the second optically anisotropic layer has a second liquid crystal alignment pattern in which an optical axis of the disk-like liquid crystal compound is parallel to a surface of the second optically anisotropic layer and is oriented along at least one in-plane direction of the second optically anisotropic layer, orientation of the optical axis of the disk-like liquid crystal compound changes continuously and rotationally along the at least one in-plane direction of the second optically anisotropic layer, and the orientation of the optical axis of the disk-like liquid crystal compound rotates by 180° with a period of 0.5 μm to 5 μm.

2. The optical element according to claim 1,
wherein an in-plane retardation of the first optically anisotropic layer with respect to light having a first wavelength $\lambda_1$ is in a range of $0.36\lambda_1$ to $0.64\lambda_1$.

3. The optical element according to claim 1,
wherein an in-plane retardation of the second optically anisotropic layer with respect to light having a second wavelength $\lambda_2$ is in a range of $0.36\lambda_2$ to $0.64\lambda_2$.

4. The optical element according to claim 1,
wherein an in-plane retardation of the optically anisotropic layer having the laminated structure with respect to light having a wavelength $\lambda$ is in a range of $0.36\lambda$ to $0.64\lambda$.

5. The optical element according to claim 1,
wherein the rod-like liquid crystal compound in the first optically anisotropic layer is twistedly aligned in a thickness direction of the first optically anisotropic layer according to a first twist property.

6. The optical element according to claim 1,
wherein the disk-like liquid crystal compound in the second optically anisotropic layer is twistedly aligned in a thickness direction of the second optically anisotropic layer according to a second twist property.

7. The optical element according to claim 5,
wherein the disk-like liquid crystal compound in the second optically anisotropic layer is twistedly aligned in a thickness direction of the second optically anisotropic layer according to a second twist property,
the first twist property and the second twist property exhibit the same orientation, and
the twisted alignment of the optical axis of the rod-like liquid crystal compound and the twisted alignment of the optical axis of the disk-like liquid crystal compound are continuous twisted alignment in the first optically anisotropic layer and the second optically anisotropic layer.

8. The optical element according to claim 5,
wherein the disk-like liquid crystal compound in the second optically anisotropic layer is twistedly aligned in a thickness direction of the second optically anisotropic layer according to a second twist property, and
the first twist property and the second twist property exhibit opposite orientation.

9. The optical element according to claim 1,
wherein the rod-like liquid crystal compound in the first optically anisotropic layer and the disk-like liquid crystal compound in the second optically anisotropic layer are continuously cholesterically aligned in a thickness direction.

10. The optical element according to claim 1,
wherein the rod-like liquid crystal compound in the first optically anisotropic layer exhibits first cholesteric alignment in a thickness direction, and
the disk-like liquid crystal compound in the second optically anisotropic layer exhibits second cholesteric alignment in a thickness direction.

\* \* \* \* \*